United States Patent
Fujimoto et al.

(10) Patent No.: US 9,398,135 B2
(45) Date of Patent: Jul. 19, 2016

(54) MOBILE TERMINAL WITH TELEPHONE FUNCTION, METHOD FOR CONTROLLING MOBILE TERMINAL WITH TELEPHONE FUNCTION, AND COMPUTER-READABLE RECORDING MEDIUM

(71) Applicant: Sharp Kabushiki Kaisha, Osaka-shi, Osaka (JP)

(72) Inventors: Masahiro Fujimoto, Osaka (JP); Takeshi Ohkubo, Osaka (JP); Fumihiko Suzuki, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 53 days.

(21) Appl. No.: 14/363,935

(22) PCT Filed: Jan. 17, 2013

(86) PCT No.: PCT/JP2013/050826
§ 371 (c)(1),
(2) Date: Jun. 9, 2014

(87) PCT Pub. No.: WO2013/118551
PCT Pub. Date: Aug. 15, 2013

(65) Prior Publication Data
US 2014/0302892 A1  Oct. 9, 2014

(30) Foreign Application Priority Data

Feb. 8, 2012  (JP) ................................ 2012-025558

(51) Int. Cl.
*H04B 1/38* (2015.01)
*H04M 1/725* (2006.01)
(Continued)

(52) U.S. Cl.
CPC ........ *H04M 1/72522* (2013.01); *H04M 1/2745* (2013.01); *H04M 1/56* (2013.01);
(Continued)

(58) Field of Classification Search
CPC ..................... H04M 1/72519; H04M 3/53325; G06F 1/1626; H04W 4/12; H04W 12/02
USPC ................ 455/564, 556.2, 412.1, 412.2, 566; 380/270; 379/88.18
See application file for complete search history.

(56) References Cited

U.S. PATENT DOCUMENTS

| | | | |
|---|---|---|---|
| 2006/0025112 A1* | 2/2006 | Hamanaga | H04M 1/56 455/412.1 |
| 2006/0058063 A1* | 3/2006 | Bocking | H04M 1/7258 455/556.2 |
| 2008/0293452 A1* | 11/2008 | Vander Veen | H04M 1/72522 455/564 |

FOREIGN PATENT DOCUMENTS

| | | |
|---|---|---|
| JP | 10-200621 A | 7/1998 |
| JP | 2003-188978 A | 7/2003 |

*Primary Examiner* — Charles Appiah
*Assistant Examiner* — Alexander Yi
(74) *Attorney, Agent, or Firm* — Birch, Stewart, Kolasch & Birch, LLP

(57) ABSTRACT

A mobile terminal (1) includes a telephone communication control section (23) which makes a call by use of a details screen (320b) for a person to contact and causes a screen (330c) showing that a call is being made to be displayed; and a telephone communication establishment determining section (23a) which, in a case where a telephone communication has been established, terminates a telephone book application (32), and which, in a case where no telephone communication has been established, after the display of the screen (330c) showing that a call is being made, causes the details screen for a person to contact to be displayed. This makes it possible to prevent (i) a display of personal information registered in a telephone book DB and (ii) a decrease in user convenience even in a case where a call is made by use of a screen of a telephone book application.

9 Claims, 9 Drawing Sheets

(51) Int. Cl.
*H04M 1/56* (2006.01)
*H04M 1/2745* (2006.01)
*H04M 1/57* (2006.01)

(52) U.S. Cl.
CPC .......... *H04M 1/575* (2013.01); *H04M 1/72519* (2013.01); *H04M 1/72552* (2013.01); *H04M 2250/22* (2013.01); *H04M 2250/60* (2013.01)

FIG. 3

| Name | Telephone Number | Mail Address | SNS Contact | Group |
|---|---|---|---|---|
| Aoki Taro | 090-0000-XXXX | XX@XXX.co.jp | XXXXXXX | Company |
| Ueda Ao | 090-0000-XXXX | XX@XXX.co.jp | XXXXXXX | Friend |
| Okada | 090-0000-XXXX | XX@XXX.co.jp | — | Friend |
| | | | | |

MOBILE TERMINAL WITH TELEPHONE FUNCTION, METHOD FOR CONTROLLING MOBILE TERMINAL WITH TELEPHONE FUNCTION, AND COMPUTER-READABLE RECORDING MEDIUM

TECHNICAL FIELD

The present invention relates to a mobile terminal having a telephone function, a method for controlling a mobile terminal having a telephone function, a program for controlling a mobile terminal having a telephone function, and a computer-readable storage medium.

BACKGROUND ART

In recent years, a function has been developed which increases user convenience by saving a user trouble of carrying out an operation while making a call.

Examples of such a function includes (i) a telephone book function for preregistering a name of a contact with which name a telephone number is associated, and causing a screen to display, for example, the preregistered name of the contact and the telephone number; and (ii) a call function which allows a call to be made by use of a call history screen that chronologically displays names of contacts to each of which a call was made before.

Patent Literature 1 discloses a communication terminal in which a person to contact and a time period in which the person can establish a telephone communication are preregistered in a telephone book database so that the person and the time period are associated with each other.

In a case where outside a time period in which a person with which to establish a telephone communication can establish a telephone communication, a user is to make a call to the person, the communication terminal causes the user to transmit a mail to the person while preventing the user from establishing a telephone communication with the person, or causes the user to make a call to another person, who is concerned with the person, within a time period in which the another person can establish a telephone communication.

As described above, the communication terminal of Patent Literature 1 makes it possible to carry out, by use of the telephone book function, operations that differ in accordance with whether or not a telephone communication with a person to contact has been established. This allows a smooth exchange of pieces of information such as informative matters.

Patent Literature 2 discloses a telephone configured such that: destination dial numbers to each of which a call was made before and which are stored in a dial destination history memory are sequentially displayed every time a "redial" button is pressed; and after the display of the destination dial numbers which are stored in the dial destination history memory is terminated, registration destination dial numbers which are preregistered in a telephone book registration content memory are subsequently sequentially displayed.

According to the telephone, in a case where a call function is used and a single operation of pressing the "redial button" is carried out, it is possible to read out (i) dial numbers of persons to contact to each of which dial numbers a call was made before and (ii) dial numbers of persons to contact which dial numbers are preregistered. As a result of this, a dial callout can be made easier, and a device can be made smaller by a reduction in number of buttons.

CITATION LIST

Patent Literatures

Patent Literature 1
Japanese Patent Application Publication, Tokukai, No. 2003-188978 A (Publication Date: Jul. 4, 2003)
Patent Literature 2
Japanese Patent Application Publication, Tokukaihei, No. 10-200621 A (Publication Date: Jul. 31, 1998)

SUMMARY OF INVENTION

Technical Problem

According to the mobile terminal of Patent Literature 1, in a case where the telephone book function is used and no telephone communication with a person to contact is established, it is possible to contact the person by mail which serves as different contact means. However, it is necessary to check in advance a time period in which the person to contact can establish a telephone communication, and to register the time period in the telephone book database. Therefore, registration of information on a person contact to contact causes much trouble. This is less convenient.

Patent Literature 1 does not consider a screen which is displayed after a telephone communication has been established. A display screen for carrying out the telephone book function includes many pieces of personal information. Therefore, in a case where the display screen for carrying out the telephone book function is redisplayed though a telephone communication has been established, in order to ensure safety, the user needs to carry out an operation of closing the display screen for carrying out the telephone book function. This is less convenient.

Patent Literature 2 does not disclose a technique for, after making a call by use of the display screen for carrying out the telephone book function, causing a subsequent display screen to vary in accordance with whether or not a telephone communication has been established. Therefore, according to the telephone disclosed in Patent Literature 2, it is impossible to prevent a continued display of personal information and a decrease in user operational convenience.

The present invention has been made in view of the problems, and an object of the present invention is to prevent (i) a continued display of personal information registered in a telephone book database and (ii) a decrease in user convenience even in a case where a call process for establishing a telephone communication is carried out by use of a screen of a telephone book application.

Solution to Problem

In order to achieve the object, a mobile terminal according to an embodiment of the present invention, the mobile terminal having a telephone function, includes: a display section; a telephone book database in which a name of a person to contact and a telephone number are registered so as to be associated with each other; a telephone book application for obtaining information which is registered in the telephone book database; a telephone application for making a call, the telephone application differing from the telephone book application; a memory section in which the telephone book application and the telephone application are stored; a telephone book control section which executes the telephone book application and causes the display section to display a details screen for a person to contact which details screen displays the name of the person to contact which name is registered in the telephone book database and the telephone number that is registered in the telephone book database so as to be associated with the name; a telephone communication control section which carries out a call process with respect to the telephone number that is registered in the telephone book database so as to be associated with the name of the person to contact which name is displayed in the details screen for a person to contact, and which causes the display section to display a screen showing that a call is being made; and a telephone communication establishment determining section which, when the telephone communication control section carries out the call process, determines whether or not a telephone communication has been established, in a case where the telephone communication establishment determining section determines that a telephone communication has been established, the telephone book control section terminating the execution of the telephone book application, and in a case where the telephone communication establishment determining section determines that no telephone communication has been established, after the telephone communication control section terminates the display of the screen showing that a call is being made, the telephone book control section causing the display section to redisplay the details screen for a person to contact.

In order to achieve the object, a method according to an embodiment of the present invention for controlling a mobile terminal having a telephone function, the mobile terminal including: a display section; a telephone book database in which a name of a person to contact and a telephone number are registered so as to be associated with each other; a telephone book application for obtaining information which is registered in the telephone book database; a telephone application for making a call, the telephone application differing from the telephone book application; and a memory section in which the telephone book application and the telephone application are stored; the method includes the steps of: executing the telephone book application and causing the display section to display a details screen for a person to contact which details screen displays the name of the person to contact which name is registered in the telephone book database and the telephone number that is registered in the telephone book database so as to be associated with the name; carrying out a call process with respect to the telephone number that is registered in the telephone book database so as to be associated with the name of the person to contact which name is displayed in the details screen for a person to contact, and causing the display section to display a screen showing that a call is being made; when the call process is carried out, determining whether or not a telephone communication has been established; in a case where it is determined that a telephone communication has been established, terminating the execution of the telephone book application; and in a case where it is determined that no telephone communication has been established, after the display of the screen showing that a call is being made is terminated, causing the display section to redisplay the details screen for a person to contact.

According to the configuration, when the telephone communication control section carries out the call process, the telephone communication establishment determining section determines whether or not a telephone communication has been established. Therefore, it is unnecessary to preregister, in the telephone book database, a time period in which a person to contact can establish a telephone communication. Further, it is possible to prevent an increase in load on a user of registering, in the telephone book database, information on a person to contact. This makes it possible to prevent a decrease in user convenience.

Further, according to the configuration, in a case where the telephone communication control section carries out, by use of the details screen for a person to contact which details screen is displayed in the display section by executing the telephone book application, the call process with respect to the telephone number of the person to contact which telephone number is displayed in the details screen for a person to contact, and the telephone communication establishment determining section determines that a telephone communication has been established, the telephone book control section terminates the execution of the telephone book application.

As described earlier, in a case where a telephone communication has been established, the telephone book control section terminates the execution of the telephone book application which has been displaying the details screen for a person to contact an object of which details screen of being displayed in the display section has been achieved. Therefore, the details screen for a person to contact which details screen includes many pieces of personal information is redisplayed only by user operation.

Therefore, in order to close the details screen for a person to contact, it is unnecessary for the user to carry out any operation. As a result, as compared with a case where the details screen for a person to contact continues to be displayed though an object of displaying, in the display section, the details screen for a person to contact has been achieved, the configuration makes it possible to prevent a continued display of personal information registered in the telephone book database while increasing user convenience.

Further, according to the configuration, in the case where the telephone communication control section carries out, by use of the details screen for a person to contact which details screen is displayed in the display section by executing the telephone book application, the call process with respect to the telephone number of the person to contact which telephone number is displayed in the details screen for a person to contact, and the telephone communication establishment determining section determines that no telephone communication has been established, after the telephone communication control section terminates the display of the screen showing that a call is being made, the telephone book control section causes the display section to redisplay the details screen for a person to contact.

According to this, it is possible to redial, by use of the redisplayed details screen for a person to contact, the telephone number of the person to contact with which person no telephone communication has been established, or to contact the person to contact by use of another contact means. Therefore, the configuration allows a further increase in user convenience as compared with a case where the details screen for a person to contact is closed though the object of displaying, in the display section, the details screen for a person to contact has not been achieved.

As described earlier, according to the configuration, it is possible to prevent (i) a continued display of personal information registered in the telephone book database and (ii) a decrease in user convenience even in a case where the call process for establishing a telephone communication is carried out by use of a screen which is displayed by executing the telephone book application.

Advantageous Effects of Invention

According to an embodiment of the present invention, it is possible to yield an effect of preventing (i) a continued display of personal information registered in a telephone book database and (ii) a decrease in user convenience even in a case where a call process for establishing a telephone communication is carried out by use of a screen of a telephone book application.

BRIEF DESCRIPTION OF DRAWINGS

FIG. 3 shows an example of a telephone book DB of the mobile terminal of the present invention.

DESCRIPTION OF EMBODIMENTS

An embodiment of the present invention is described below with reference to FIGS. 1 through 9.

(Appearance of Mobile Terminal 1)

Figure 2:
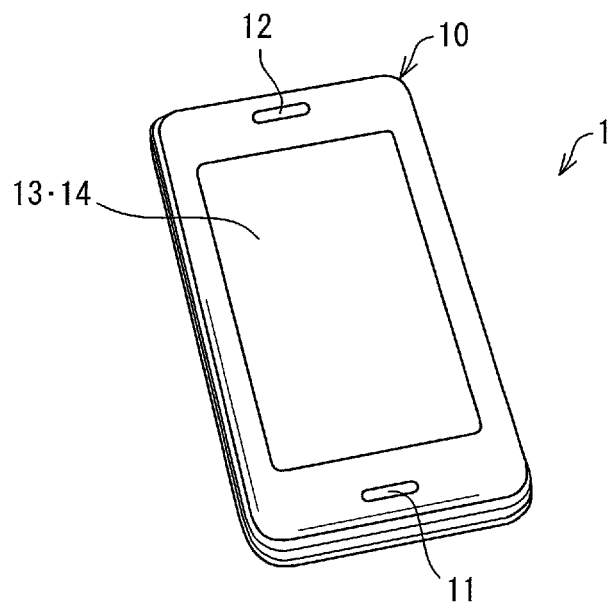
FIG. 2 is a perspective view illustrating an appearance of the mobile terminal of the present invention.

First, the following description discusses, with reference to FIG. 2, an appearance of a mobile terminal 1 of the present embodiment.

FIG. 2 is a perspective view illustrating the appearance of the mobile terminal 1 of the present embodiment.

The mobile terminal 1 includes a communication section 10, a microphone 11, a speaker 12, a display section 13, and an operation section 14 (see FIG. 2). Note that, as described later with reference to FIG. 1, the mobile terminal 1 includes a control section 20 and a memory section 30 in addition to these members.

The mobile terminal 1 is a multifunctional mobile terminal having a telephone function. The communication section 10 is provided in a casing of the mobile terminal 1, and has an antenna (not illustrated). The communication section 10 transmits and receives a wireless signal to/from a given communication destination such as a base station. By causing the communication section 10 to transmit and receive a wireless signal to/from an outside such as a base station, the mobile terminal 1 can carry out the telephone function of, for example, making a call or receiving a call, transmit and receive a mail, and be connected to the Internet.

The microphone 11 inputs a voice in signal form into the mobile terminal 1. The speaker 12 outputs a voice signal in voice form to the outside of the mobile terminal 1. A microphone having a known structure is usable as the microphone 11, and a speaker having a known structure is usable as the speaker 12.

The display section 13 is a display device for displaying a still image or a moving image. For example, according to the present embodiment, the display section 13 is a liquid crystal display device. Note that the display section 13 is not limited to a liquid crystal display device but may be, for example, a display device such as an organic EL display device that can display a still image or a moving image.

The operation section 14 obtains an input from a user, causes a signal in accordance with the obtained input to be an input signal, and outputs the input signal to, for example, the control section 20 (described later) provided in the mobile terminal 1. The present embodiment assumes that the operation section 14 is a touch panel. The operation section 14 is provided on the entire surface of the display section 13. Note that the operation section 14 is not limited to a touch panel but may be provided separately from the display section and have a plurality of buttons such as a numeric keypad.

(Configuration of Mobile Terminal 1)

Figure 1:
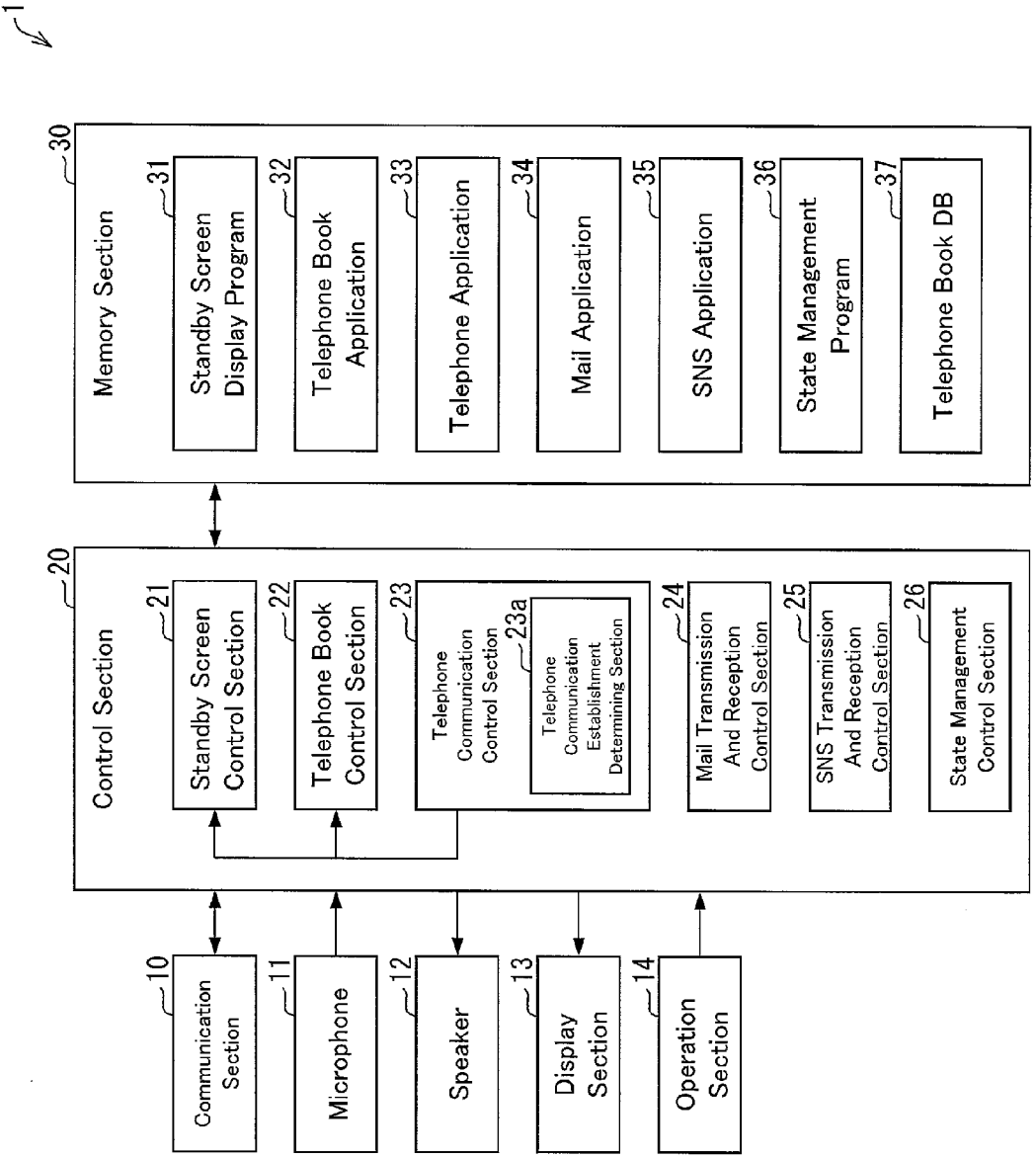
FIG. 1 is a functional block diagram showing a configuration of a mobile terminal of the present invention.

Next, a configuration of the mobile terminal 1 is described below with reference to FIGS. 1 and 3. FIG. 1 is a functional block diagram showing the configuration of the mobile terminal 1 of the present embodiment.

As shown in FIG. 1, the mobile terminal 1 includes the control section 20 and the memory section 30 in addition to the communication section 10, the microphone 11, the speaker 12, the display section 13, and the operation section 14 (each described earlier with reference to FIG. 2). The mobile terminal 1 further includes a memory such as a RAM (not illustrated).

The control section 20 includes a standby screen control section (icon screen control section) 21, a telephone book control section 22, a telephone communication control section 23, a mail transmission and reception control section 24, an SNS transmission and reception control section 25, and a state management control section 26.

The control section 20 is provided in the casing of the mobile terminal 1, and is constituted by, for example, a CPU (Central Processing Unit). By loading, in accordance with an input signal which is an instruction received from the user via the operation section 14, various applications and programs each stored in the memory section 30 and executing, for example, the various applications and programs thus loaded, the control section 20 causes the mobile terminal 1 to carry out various functions. The control section 20 may be constituted by a single CPU or may be constituted by a plurality of CPUs.

In the memory section 30, a standby screen display program (icon screen display program) 31, a telephone book application 32, a telephone application 33, a mail application (contact information application) 34, an SNS (social network service) application (contact information application) 35, a telephone book DB (database) 37, and a state management program 36 are stored. Further, in the memory section 30 other various programs for carrying out the various functions of the mobile terminal 1 are stored.

For example, the memory section 30 may be a ROM or the like that is provided in the casing of the mobile terminal 1, may be a storage medium or the like that is removable from the mobile terminal 1, or may be constituted by both the ROM or the like and the storage medium or the like.

By loading the standby screen display program 31 from the memory section 30 and executing the loaded standby screen display program 31, the standby screen control section 21 causes the display section 13 to display a standby screen.

The telephone book control section 22 is a control section for causing the mobile terminal 1 to carry out a telephone book function.

The telephone book control section 22 loads the telephone book application 32 from the memory section 30, executes the loaded telephone book application 32, and with reference to the telephone book DB 37, causes the display section 13 to display a display screen showing the telephone book application 32. Specifically, as described later, the telephone book control section 22 causes the display section 13 to display a contact list screen 320a, a details screen 320b for a person to contact, or the like.

The telephone communication control section 23 is a control section for causing the mobile terminal 1 to carry out the telephone function. The telephone communication control section 23 loads the telephone application 33 from the memory section 30, executes the loaded telephone application 33, and with reference to the telephone book DB 37, causes the display section 13 to display a display screen showing the telephone application 33. Specifically, the telephone communication control section 23 causes the display section 13 to display a telephone number etc. input screen 330a, an outgoing call history display screen 330b, an incoming call history display screen 330e, a screen 330c showing that a call is being made, a screen 330d showing that a telephone communication is being established, or the like.

The telephone communication control section 23 includes a telephone communication establishment determining section 23a. In a case where the telephone communication control section 23 makes a call, the telephone communication establishment determining section 23a determines whether or not a telephone communication has been established.

For example, in the following case, the telephone communication establishment determining section 23a determines that a telephone communication has been established or that no telephone communication has been established.

A case where a telephone communication has been established refers to a case where a call request caused by a call operation carried out with respect to the mobile terminal 1 has reached, via a base station, a mobile phone, a fixed-line phone, or the like of a person to contact, and the person to contact has answered a call. Note, however, that the case where a telephone communication has been established also includes a case where a recording has been made to an answering machine of the mobile phone or the fixed-line phone of the person to contact.

A case where no telephone communication has been established can be exemplified by the following cases:

(i) a case where a call request caused by a call operation carried out with respect to the mobile terminal 1 has been unsuccessful for some reason before being sent to a wireless line such as a base station;

(ii) a case where a call request caused by a call operation carried out with respect to the mobile terminal 1 has been rejected or has been unsuccessful while passing through, for example, a base station;

(iii) a case where, even if a call request caused by a call operation carried out with respect to the mobile terminal 1 has reached, via, for example, a base station, a mobile phone, a fixed-line phone, or the like of a person to contact, the person to contact has carried out call blocking without answering a call;

(iv) a case where, even if a call request caused by a call operation carried out with respect to the mobile terminal 1 has reached, via, for example, a base station, a mobile phone, a fixed-line phone, or the like of a person to contact, the person to contact has not answered a call, and the base station has disconnected from the mobile phone, the fixed-line phone, or the like;

(v) a case where a deterioration in state of somewhere in a wireless line such as a base station has made it impossible to continue a wireless communication; and (vi) a case where the user who is a caller has interrupted a call at some point in time while the mobile terminal 1 is carrying out a call process.

The mail transmission and reception control section 24 is a control section for causing the mobile terminal 1 to transmit and receive a mail. The mail transmission and reception control section 24 loads the mail application 34 from the memory section 30, and transmits and receives a mail via the communication section 10 by executing the loaded mail application 34.

The SNS transmission and reception control section 25 is a control section for causing the mobile terminal 1 to carry out a process for using a so-called SNS (social network service). By loading an SNS application 35 from the memory section 30 and executing the loaded SNS application 35, the SNS transmission and reception control section 25 transmits and receives information for using various SNSs via the communication section 10.

An SNS is exemplified by generally used social networking services such as Mixi (Registered Trademark) and Twitter (Registered Trademark).

The state management control section 26 is a control section for managing various states (e.g., a remaining battery amount) of the mobile terminal 1. By loading a state management control program 36 from the memory section 30 and executing the loaded state management control program 36, the state management control section 26 manages the various states of the mobile terminal 1.

The telephone book application 32 is a program which is executed by the telephone book control section 22 so as to cause the mobile terminal 1 to carry out the telephone book function. For example, the telephone book application 32 includes a program for displaying the contact list screen 320a, a program for displaying the details screen 320b for a person to contact, and the like.

The telephone application 33 is a program which differs from the telephone book application 32 and is executed by the telephone communication control section 23 so as to cause the mobile terminal 1 to carry out the telephone function. The telephone application 33 includes a program for displaying the telephone number etc. input screen 330a, a program for displaying the outgoing call history display screen 330b, a program for displaying the incoming call history display screen 330e, a program for displaying the screen 330c showing that a call is being made, a program for displaying the screen 330d showing that a telephone communication is being established, and the like.

The mail application 34 is a program which is executed by the mail transmission and reception control section 24 so as to transmit and receive a mail.

The SNS application 35 is a program which is executed by the SNS transmission and reception control section 25 so as to use an SNS.

The state management program 36 is a program which is executed by the state management control section 26 so as to manage the various states of the mobile terminal 1.

The telephone book D 37 is a DB for registering a name of a person to contact with which name various pieces of contact information are associated.

FIG. 3 shows an example of a telephone book DB.

As shown in FIG. 3, in the telephone book DB 37, names of a plurality of persons to contact with which names respective telephone numbers, respective mail addresses, respective SNS contacts, and respective groups are associated are registered as the contact information.

(Description of Change of Display Screens of Mobile Terminal of Comparative Example and Process Carried Out by the Mobile Terminal)

Next, in advance of describing a change of display screens of the mobile terminal 1 of the present embodiment and how the mobile terminal 1 carries out a process, the following description discusses, as a comparative example, a change of display screens of two mobile terminals each of which differs in type from the mobile terminal 1 and respective processes carried out by the two mobile terminals.

First, a change of display screens of a mobile terminal of Comparative Example 1 and a process carried out by the mobile terminal are described below with reference to FIGS. 4 and 5.

The mobile terminal carries out the process as below in a case where a call is made by selecting a contact from a telephone book application and in a case where a contact is selected from an outgoing call history screen.

First, the following description discusses the case where a call is made by selecting a contact from a telephone book application.

Figure 4:
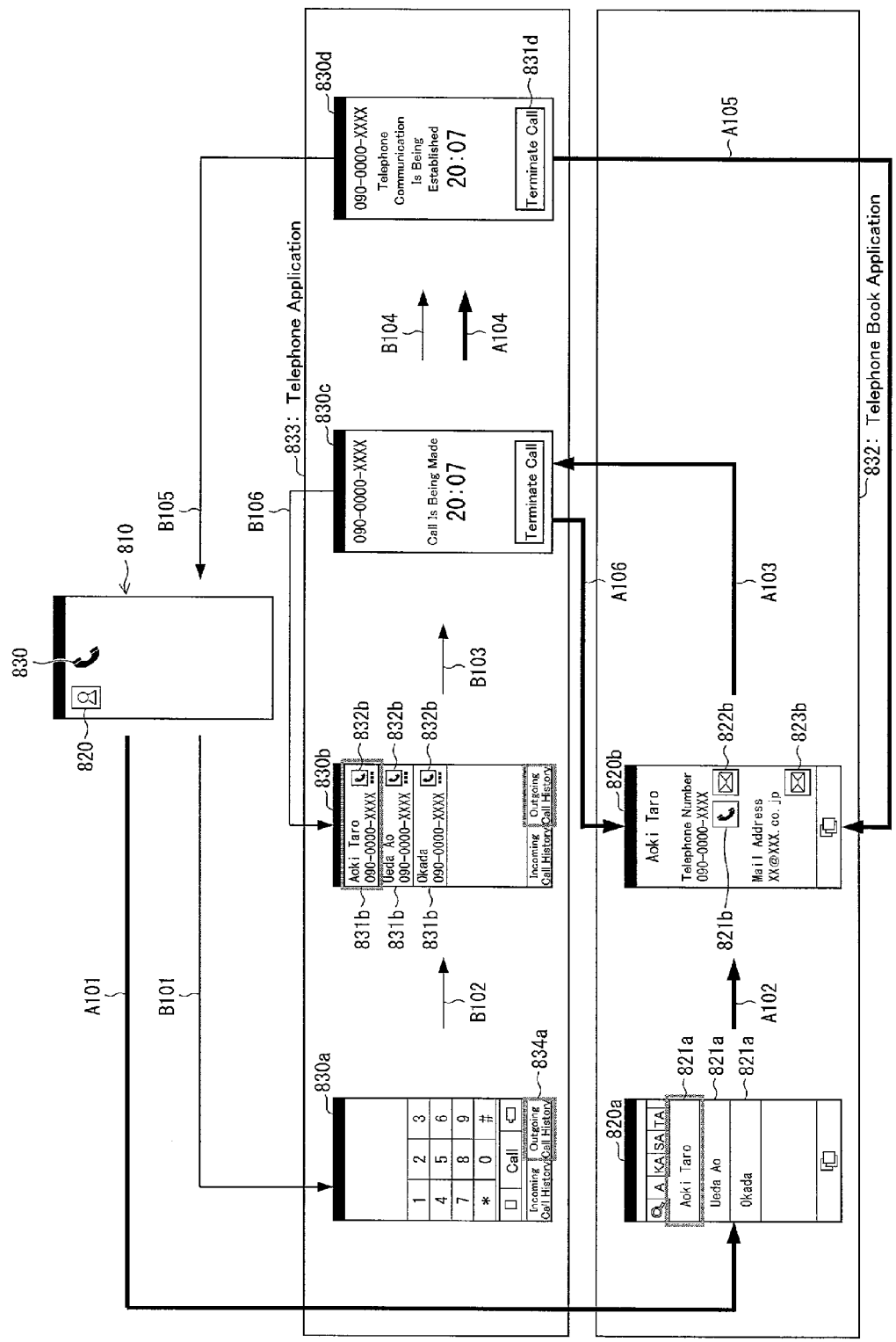
FIG. 4 illustrates a change of display screens of a mobile terminal of Comparative Example 1.

FIG. 4 illustrates a change of display screens of the mobile terminal of Comparative Example 1. FIG. 5 is a flowchart showing how the mobile terminal of Comparative Example 1 carries out the process.

The mobile terminal includes a touch-panel display section. The display screens illustrated in FIG. 4 are screens displayed in the display section.

Figure 5:
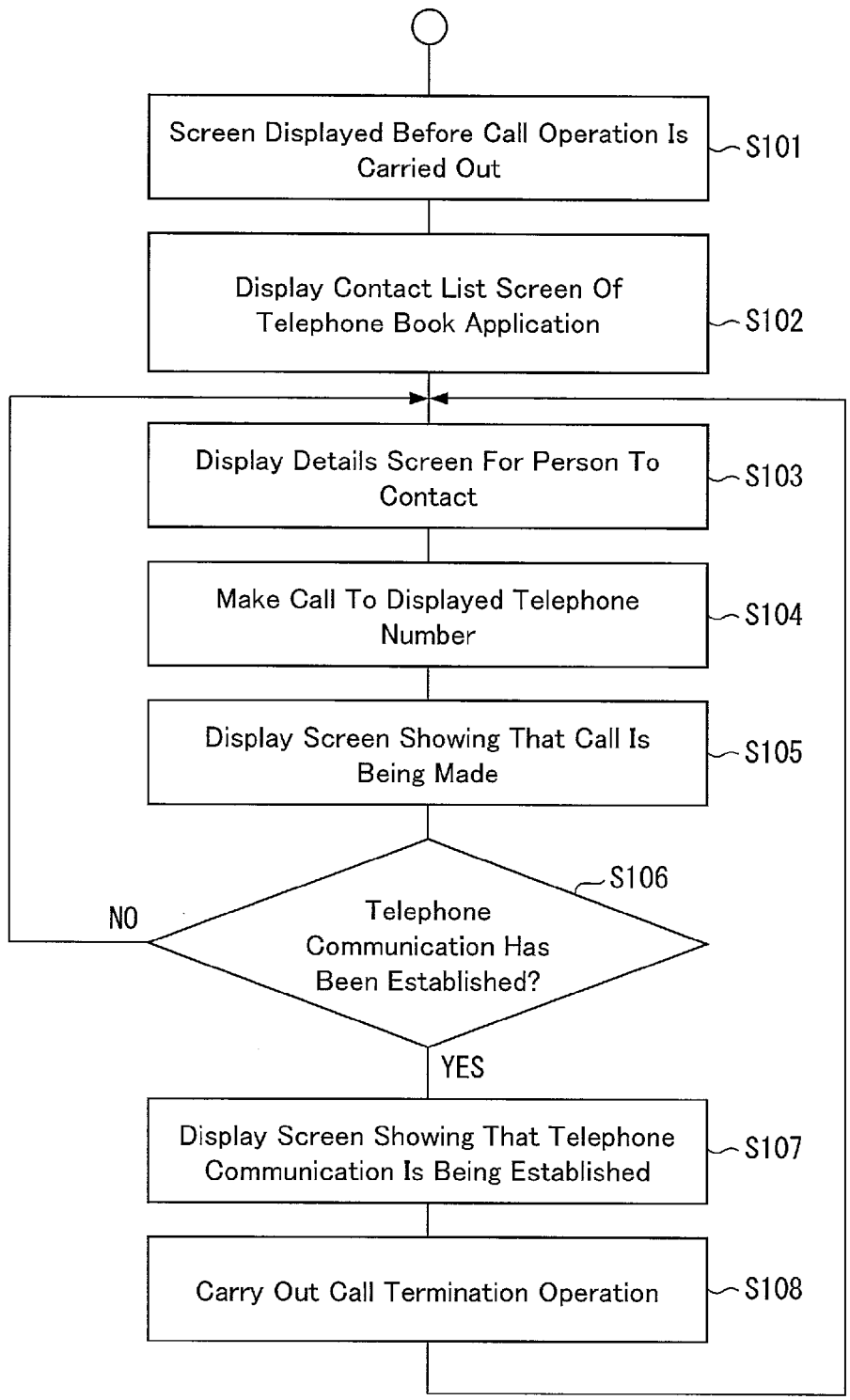
FIG. 5 is a flowchart showing how the mobile terminal of Comparative Example 1 carries out a process.

As illustrated in FIG. 4, the display section of the mobile terminal displays a standby screen 810 as a screen which is displayed before a call operation is carried out (step S101 in FIG. 5). The standby screen 810 which is displayed in the display section of the mobile terminal is provided with a telephone book application activation icon 820 and a telephone application activation icon 830.

The telephone book application activation icon 820 is selected by a user. Then, the mobile terminal activates a telephone book application 832, and as shown by an arrow A101 in FIG. 4, the display screens of the display section change, and the display section displays a contact list screen 820*a* of the telephone book application (step S102 in FIG. 5).

When the user selects, from a plurality of contact fields 821*a* displayed in the contact list screen 820*a*, a contact field 821*a* for a desired person to contact, as shown by an arrow A102 in FIG. 4, the display section displays a details screen 820*b* for a selected person to contact (step S103 in FIG. 5). The details screen 820*b* for a person to contact is provided with a call icon 821*b* and mail application activation icons 322*b* and 323*b*.

When the user selects the call icon 821*b*, the mobile terminal activates a telephone application 833 so as to make a call to a telephone number displayed in the details screen 820*b* for a person to contact (step S104 in FIG. 5). As shown by an arrow A103 in FIG. 4, the display screens of the display section change, and the display section displays a screen 830*c* showing that a call is being made (step S105 in FIG. 5).

Then, the mobile terminal determines whether or not a telephone communication with a person to contact has been established (step S106 in FIG. 5).

In a case where the telephone communication with the person to contact has been established (YES at step S106 in FIG. 5), as shown by an arrow A104 in FIG. 4, the display screens change, and the display section displays a screen 830*d* showing that a telephone communication is being established (step S107 in FIG. 5). When the user carries out a call termination operation by, for example, selecting a call termination icon 831*d* provided in the screen 830*d* showing that a telephone communication is being established (step S108 in FIG. 5), as shown by an arrow A105 in FIG. 4, the display screens of the display section change, and the display section displays the details screen 820*b* for a person to contact of the telephone book application. That is, the process returns to step S103 in FIG. 5.

Meanwhile, in a case where no telephone communication with the person to contact has been established while the display section is displaying the screen 830*c* showing that a call is being made (No at step S106 in FIG. 5), as shown by an arrow A106 in FIG. 4, the display screens of the display section change, and the display section displays the details screen 820*b* for a person to contact of the telephone book application. That is, the process returns to step S103 in FIG. 5.

Next, the following description discusses a change of the display screens of the mobile terminal and the process carried out by the mobile terminal in the case where a call is made by selecting a contact from an outgoing call history screen.

As illustrated in FIG. 4, the display section of the mobile terminal displays the standby screen 810 as a screen which is displayed before a call operation is carried out.

The telephone application activation icon 830 is selected by the user. Then, the mobile terminal activates the telephone application 833, and as shown by an arrow B101 in FIG. 4, the display screens of the display section change, and the display section displays a telephone number etc. input screen 830*a* of the telephone application 833. Next, an outgoing call history icon 834*a* provided in the telephone number etc. input screen 830*a* is selected by the user.

Then, as shown by an arrow B102 in FIG. 4, the display screens of the display section change, and the display section displays an outgoing call history display screen 830*b*. The outgoing call history display screen 830*b* includes contact fields 831*b* which are chronologically provided and show respective contacts with each of which a call was made before.

When the call icon 832*b* provided in a desired contact field 831*b* is selected by the user, the mobile terminal makes a call to a telephone number shown in the selected contact field 831*b*, and as shown by an arrow B103 in FIG. 4, the display screens of the display section change, and the display section displays the screen 830*c* showing that a call is being made.

Then, the mobile terminal determines whether or not a telephone communication with a person to contact has been established.

In the case where the telephone communication with the person to contact has been established, as shown by an arrow B104 in FIG. 4, the display screens change, and the display section displays the screen 830*d* showing that a telephone communication is being established. When the user carries out the call termination operation by, for example, selecting the call termination icon 831*d*, as shown by an arrow B105 in FIG. 4, the display screens of the display section change, and the display section displays the standby screen 810.

Meanwhile, in the case where no telephone communication with the person to contact has been established while the display section is displaying the screen 830*c* showing that a call is being made, as shown by an arrow B106 in FIG. 4, the display screens of the display section change, and the display section displays the outgoing call history display screen 830*b*.

As described earlier, according to the mobile terminal of Comparative Example 1, in a case where a call has been made to a contact by use of the outgoing call history display screen 830*b* of the telephone application 833 and a telephone communication with a person to contact has been established, after displaying the screen 830*d* showing that a telephone communication is being established, the display section displays not the outgoing call history display screen 830b but the standby screen 810 as shown by the arrow B105 in FIG. 4.

This is because, in the case where the telephone communication with the person to contact has been established, an object of the display section of displaying the call history display screen 830b is achieved by the telephone communication with the person to contact. According to this, after the telephone communication is terminated, the call history display screen 830b is not displayed when the user desires to carry out another operation. This saves the user trouble of carrying out an operation to terminate the display of the call history display screen 830b.

According to the mobile terminal, in a case where a call has been made to a contact by use of the outgoing call history display screen 830b of the telephone application 833 and no telephone communication with a person to contact has been established, the display section displays the outgoing call history display screen 830b as shown by the arrow B106 in FIG. 4. This requires fewer operations for redialing, so that user convenience is increased.

Meanwhile, in a case where a call has been made to a person to contact by use of the contact list screen 820a of the telephone book application 832, whether or not a telephone communication with the person to contact has been established, the change of the display screens as shown by the arrow A106 or the arrow A105 causes the display section to redisplay the details screen 820b for a person to contact.

As described earlier, only in a case where a call has been made by use of the outgoing call history display screen 830b of the telephone application 833, the mobile terminal changes a subsequent display screen in accordance with whether or not a telephone communication with a person to contact has been established. In a case where a call has been made by use of the contact list screen 820a of the telephone book application 832, without changing a subsequent display screen in accordance with whether or not a telephone communication with a person to contact has been established, the mobile terminal displays the details screen 820b for an identical person to contact.

This is because the outgoing call history display screen 830b and the screen 830c showing that a call is being made, the screen 830c being displayed during the determination whether or not a telephone communication with a person to contact has been established are included in the same telephone application 833, and the details screen 820b for a person to contact is included in the telephone book application 832, which differs from the telephone application 833.

That is, due to much trouble caused by development of a program, an application which differs from the telephone application 833 that determines whether or not a telephone communication with a person to contact has been established has not been used to carry out a process for causing a display screen to vary in accordance with whether or not a telephone communication with a person to contact has been established.

However, the following problem is revealed as development for increasing user convenience is advanced.

That is, in a case where a call has been made to a person to contact by use of the contact list screen 820a of the telephone book application 832 and a telephone communication has been established, the mobile terminal redisplays the details screen 820b for a person to contact though the establishment of the telephone communication has made it possible to achieve an object of displaying the details screen 820b for a person to contact. Therefore, the user needs to carry out an operation of closing the redisplayed details screen 820b for a person to contact. This causes trouble to the user.

Further, the details screen 820b for a person to contact is more likely to include more pieces of personal information than the call history display screen 830b. Therefore, after the establishment of the telephone communication, the user who desires to cause the mobile terminal to be in a standby state while a display screen of the display section is not changed needs to carry out an operation of closing the details screen 820b for a person to contact. This causes trouble to the user.

Meanwhile, in a case where a call has been made to a person to contact by use of the details screen 820b for a person to contact and no telephone communication has been established, the details screen 820b for a person to contact needs to be redisplayed as described earlier. The details screen 820b for a person to contact needs to be redisplayed so as to save trouble of reactivating the telephone book application 832 when an operation for making contact by another method (e.g., a redial operation, an operation for making a call to another telephone number, or mail transmission) is carried out.

Inventors of the present invention found a problem such that, even in a case where a call has been made by use of a display screen of the telephone book application 832, it is necessary to cause a subsequent display screen to vary in accordance with whether or not a telephone communication has been established.

Further, the mobile terminal can save the user trouble of redialing in a case where a call has been made by use of the outgoing call history display screen 830b of the telephone application 833 and no telephone communication with a person to contact has been established. However, in a case where a call has been made by use of the outgoing call history display screen 830b of the telephone application 833 and no telephone communication with a person to contact has been established, it is impossible to establish a communication by use of a telephone number or information other than the telephone number of another contact, the telephone number or the information being registered in a telephone book DB.

Specifically, it is impossible to make contact by use of a mail address (e.g., Gmail (Registered Trademark)) which is not associated with a telephone number or an SNS (e.g., Twitter (Registered Trademark)), or when the user desires to contact another person belonging to an identical group, e.g., someone registered as a "company" group, it is impossible to carry out an operation of, for example, sequentially contacting persons each belonging to the "company" group. Every time a call has been made to a person to contact by use of the details screen 820b for a person to contact of the telephone book application 832 and no telephone communication with a person to contact has been established, the user needs to activate the contact list screen 820a of the telephone book application 832. This causes trouble, so that user convenience is less great.

Further, according to a mobile terminal of Comparative Example 2 which mobile terminal differs from that of Comparative Example 1, in a case where a call has been made by use of a details screen for a person to contact which details screen is included in an identical telephone book application in which the details screen 820b for a person to contact is included, whether or not a telephone communication with a person to contact has been established, a standby screen which is identical to the standby screen 810 is displayed after a screen showing that a call is being made or a screen showing that a telephone communication is being established is displayed.

However, in the case where a call has been made by use of the detailed screen for a person to contact of the telephone book application, the mobile terminal of Comparative Example 2 also carries out no process for causing a display screen to vary in accordance with whether or not a telephone communication with a person to contact has been established.

The mobile terminal 1 of the present embodiment carries out the following process so as to solve the problems. The following description mainly discusses a change of screens of the mobile terminal 1 of the present embodiment and a process carried out by the mobile terminal 1.

(Description of Change of Display Screens of Mobile Terminal 1)

Next, the following description discusses display screens of the mobile terminal 1 of the present embodiment and a change of the display screens in a case where a call is made by use of an outgoing call history screen of a telephone application and in a case where a call is made by use of a details screen for a person to contact of a telephone book application.

Figure 6:
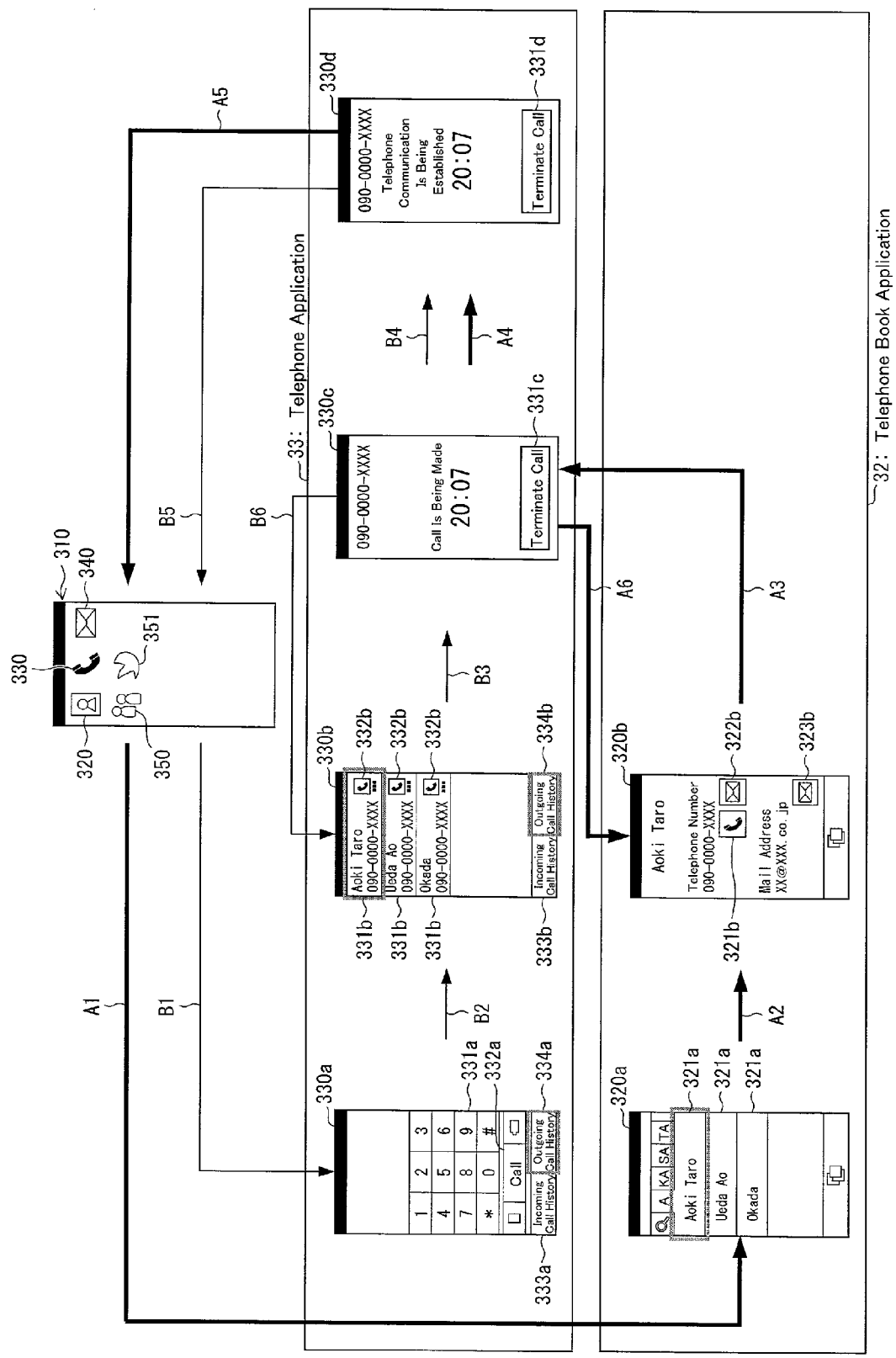
FIG. 6 illustrates display screens of the mobile terminal of the present invention and a change of the display screens.

FIG. 6 illustrates the display screens of the mobile terminal 1 and the change of the display screens.

The display screens illustrated in FIG. 6 are display screens displayed in the display section 13.

First, the following description discusses the display screens of the display section 13 and a change of the display screens in a case where the user makes a call by use of the details screen for a person to contact of the telephone book application.

As illustrated in FIG. 6, the display section 13 of the mobile terminal 1 displays a standby screen 310 as a screen which is displayed before the user carries out a call operation.

The standby screen (icon screen) 310 is provided with, for example, a telephone book application activation icon (telephone book icon) 320, a telephone application activation icon (telephone communication icon) 330, a mail application activation icon 340, and SNS activation icons 350 and 351. Note that the standby screen 310 may be provided with icons for activating other various applications.

The telephone book application activation icon 320 is an icon for activating the telephone book application 32. The telephone application activation icon 330 is an icon for activating the telephone book application 33. The mail application activation icon 340 is an icon for activating the mail application 34. The SNS activation icons 350 and 351 are icons for activating the SNS application 35.

The SNS application 35 is, for example, an application for using a so-called SNS (social networking service) such as Mixi (Registered Trademark) or Twitter (Registered Trademark).

From the icons displayed in the standby screen 310, the telephone book application activation icon 320 is selected by the user. Then, the control section 20 activates the telephone book application 32, and as shown by an arrow A1 in FIG. 6, the display screens of the display section 13 change, and the display section 13 displays the contact list screen 320a of the telephone book application 32.

The contact list screen 320a is provided with a plurality of contact lists 321a in which respective names of persons to contact which names are registered in the telephone book DB 36 are displayed. The plurality of contact lists 321a are provided in the contact list screen 320a so that the names of the persons to contact are arranged in order, e.g., in the order of the Japanese syllabary.

Then, a contact list 321a in which a name of a person whom the user desires to contact is displayed is selected by the user. For example, assume that a contact list 321a in which a name "Aoki Taro" is displayed is selected.

In this case, as shown by an arrow A2 in FIG. 6, the display section 13 displays the details screen 320b for a person to contact in which details screen 320b various contacts registered in the telephone book DB 37 are displayed so that the various contacts are associated with a name displayed in a contact list 321a selected by the user.

For example, the display section 13 displays the details screen 320b for a person to contact in which details screen 320b the name "Aoki Taro" is displayed and various contacts registered in the telephone book DB 37 such as a telephone number, a mail address, an SNS contact, and a group are displayed so that the various contacts are associated with the name "Aoki Taro".

The details screen 320b for a person to contact is provided with a call icon 321b and mail application activation icons 322b and 323b. When the mail application activation icon 322b or the mail application activation icon 323b is selected by the user, the mobile terminal 1 activates the mail application 34. Further, the details screen 320b for a person to contact may also be provided with SNS activation icons 350 and 351 for using so-called SNSs such as Mixi (Registered Trademark) and Twitter (Registered Trademark).

When the call icon 321b is selected, the mobile terminal 1 makes a call to a telephone number displayed in the details screen 320b for a person to contact.

Assume here that the call icon 321b is selected by the user. Then, the control section 20 activates the telephone application 33, and the mobile terminal 1 makes a call to a telephone number displayed in the details screen 320b for a person to contact. As shown by an arrow A3 in FIG. 6, the display screens of the display section 13 change, and the display section 13 displays the screen 330c showing that a call is being made.

In the screen 330c showing that a call is being made, text of "making a call", a telephone number to which a call is being made, and the like are displayed. Further, the screen 330c showing that a call is being made is provided with a call termination icon 331c for terminating a call which is being made.

In a case where a telephone communication with a person to contact has been established, as shown by an arrow A4 in FIG. 6, the display screens change, and the display section 13 displays the screen 330d showing that a telephone communication is being established.

In the screen 330d showing that a telephone communication is being established, a telephone number of a person to contact and text of "establishing a telephone communication" are displayed. Further, the screen 330d showing that a telephone communication is being established is provided with a call termination icon 331d for terminating a telephone communication which is being established.

Next, when the user carries out a call termination operation by, for example, selecting the call termination icon 331d provided in the screen 330d showing that a telephone communication is being established, as shown by an arrow A5 in FIG. 6, the display screens change, and the display section 13 displays none of the display screens of the telephone book application 32 but the standby screen 310.

Meanwhile, in a case where no telephone communication with the person to contact has been established while the display section 13 is displaying the screen 330c showing that a call is being made, i.e., while the mobile terminal 1 is making a call, as shown by an arrow A6 in FIG. 6, the display screens of the display section 13 change, and the display section 13 redisplays the details screen 320b for a person to contact of the telephone book application 32, the details screen 320b having been displayed earlier by one screen than the screen 330c showing that a call is being made.

Then, the user can redial, by use of the redisplayed details screen 320b for a person to contact, a telephone number of a person to contact with which person no telephone communication has been established, or can transmit, by use of another contact means such as a mail or an SNS, information to the person to contact with which person no telephone communication has been established. This makes it possible to efficiently carry out information exchange.

Next, the following description discusses the display screens of the display section 13 and a change of the display screens in a case where the user makes a call by use of an outgoing call history screen of the telephone application 33.

First, as illustrated in FIG. 6, the display section 13 of the mobile terminal 1 displays the standby screen 310 as a screen which is displayed before the user carries out a call operation.

From the icons displayed in the standby screen 310, the telephone application activation icon 330 is selected by the user. Then, the control section 20 activates the telephone application 33, and as shown by an arrow B1 in FIG. 6, the display screens of the display section 13 change, and the display section 13 displays the telephone number etc. input screen 330a of the telephone application 33.

The telephone number etc. input screen 330a is provided with, for example, a numeric keypad 331a, a call icon 332a for making a call, an outgoing call history icon 334a for displaying an outgoing call history, and an incoming call history icon 333a for displaying an incoming call history.

Assume here that the outgoing call history icon 334a is selected by the user.

Then, as shown by an arrow B2 in FIG. 6, the display screens of the display section 13 change, and the display section 13 displays the outgoing call history display screen (outgoing call history screen) 330b.

The outgoing call history display screen 330b is provided with, for example, contact fields 331b showing respective contacts to each of which the mobile terminal 1 made a call before, an incoming call history icon 333b, and an outgoing call history icon 334b. In the contact fields 331b, respective times at each of which the mobile terminal 1 made a call are chronologically arranged in an order from a later time to an earlier time. A telephone number of a contacted person is displayed in each of the contact fields 331b.

Further, in a case where a name which is associated with the telephone number is registered in the telephone book DB 37, the associated name is also displayed in a contact field 331b.

In addition, the contact fields 331b are each provided with a call icon 332b for making a call to a telephone number displayed in a corresponding contact field 331b.

When the call icon 332b provided in a desired contact field 331b is selected by the user, the mobile terminal 1 makes a call to a telephone number shown in the selected contact field 331b, and as shown by an arrow B3 in FIG. 6, the display screens of the display section 13 change, and the display section 13 displays the screen 330c showing that a call is being made.

In a case where a telephone communication with a person to contact has been established, as shown by an arrow B4 in FIG. 6, the display screens change, and the display section 13 displays the screen 330d showing that a telephone communication is being established.

Next, when the user carries out a call termination operation by, for example, selecting the call termination icon 331d, as shown by an arrow B5 in FIG. 6, the display screens change, and the display section 13 displays the standby screen 310.

Meanwhile, in a case where no telephone communication with the person to contact has been established while the display section 13 is displaying the screen 330c showing that a call is being made, i.e., while the mobile terminal 1 is making a call, as shown by an arrow B6 in FIG. 6, the display screens of the display section 13 change, and the display section 13 displays the outgoing call history display screen 330b.

Figure 7:
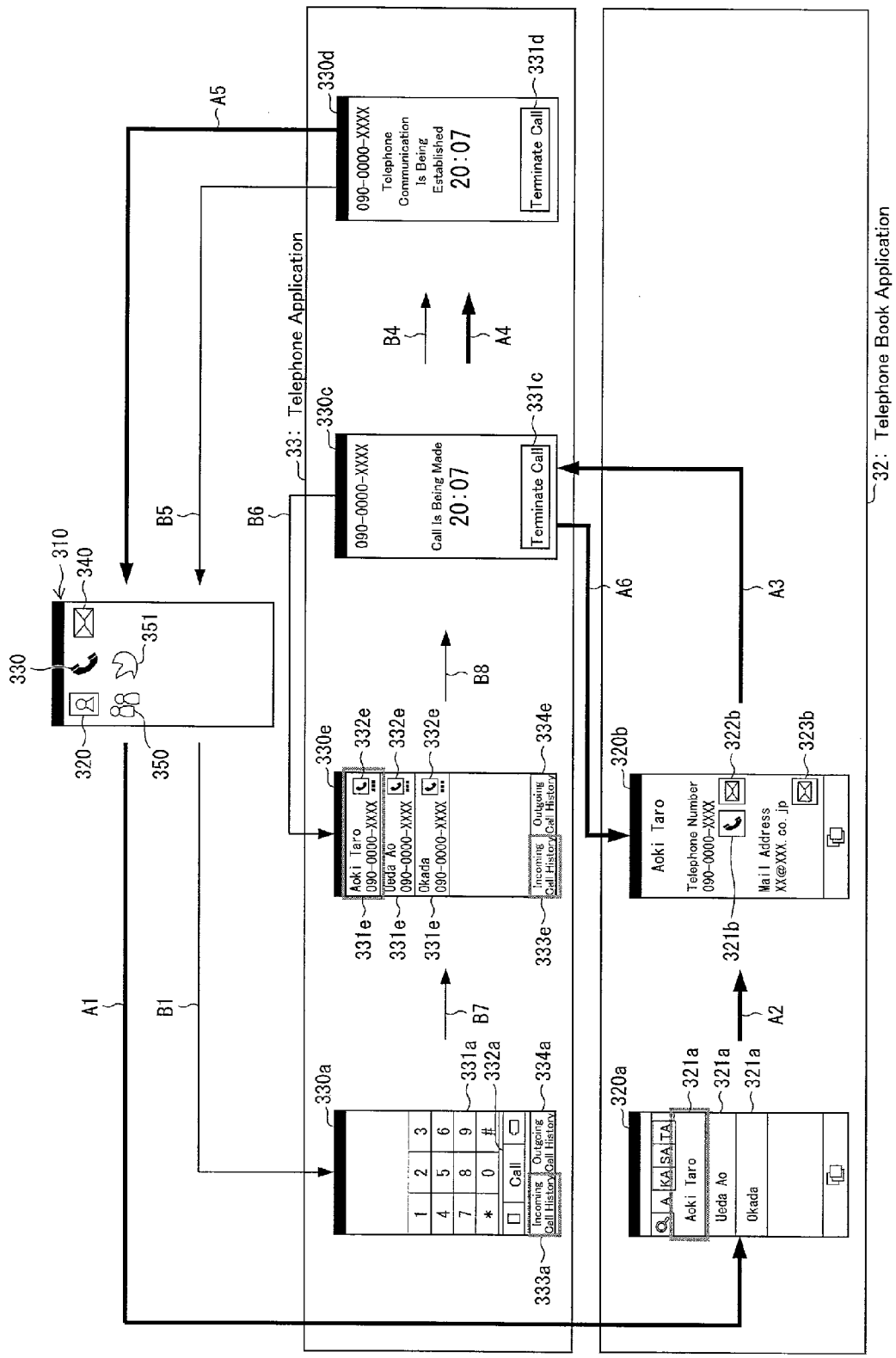
FIG. 7 illustrates display screens of the mobile terminal of the present invention and a change of the display screens.

Alternatively, as illustrated in FIG. 7, the user may make a call to a person to contact by use of an incoming call history screen of the telephone application 33. FIG. 7 illustrates the display screens of the mobile terminal 1 and a change of the display screens.

FIG. 6 and FIG. 7 differ in that the outgoing call history display screen 330b illustrated in FIG. 6 has been replaced with the incoming call history display screen 330e in FIG. 7.

When the incoming call history icon 333a of the telephone number etc. input screen 330a shown in the display section 13 is selected, as shown by an arrow B7 in FIG. 7, the display screens of the display section 13 change, and the display section 13 displays the incoming call history display screen (incoming call history screen) 330e (see FIG. 7).

The incoming call history display screen 330e is provided with, for example, contact fields 331e showing respective contacts to each of which the mobile terminal 1 made a call before, an incoming call history icon 333e, and an outgoing call history icon 334e. In the contact fields 331e, respective times at each of which the mobile terminal 1 made a call are chronologically arranged in an order from a later time to an earlier time. A telephone number of a contacted person is displayed in each of the contact fields 331e.

Further, in a case where a name which is associated with the telephone number is registered in the telephone book DB 37, the associated name is also displayed in a contact field 331e.

In addition, the contact fields 331e are each provided with a call icon 332e for making a call to a telephone number displayed in a corresponding contact field 331e.

When the call icon 332e provided in a desired contact field 331e is selected by the user, the mobile terminal 1 makes a call to a telephone number shown in the selected contact field 331e, and as shown by an arrow B8 in FIG. 7, the display screens of the display section 13 change, and the display section 13 displays the screen 330c showing that a call is being made. A subsequent change of the screens is similar to that described with reference to FIG. 6.

(Description of Process Carried Out by Mobile Terminal 1)

Next, how the mobile terminal 1 carries out the process is described below with reference to FIGS. 1, 8, and 9.

First, the following description discusses how the mobile terminal 1 carries out the process in the case where the user makes a call by use of the details screen for a person to contact of the telephone book application.

Figure 8:
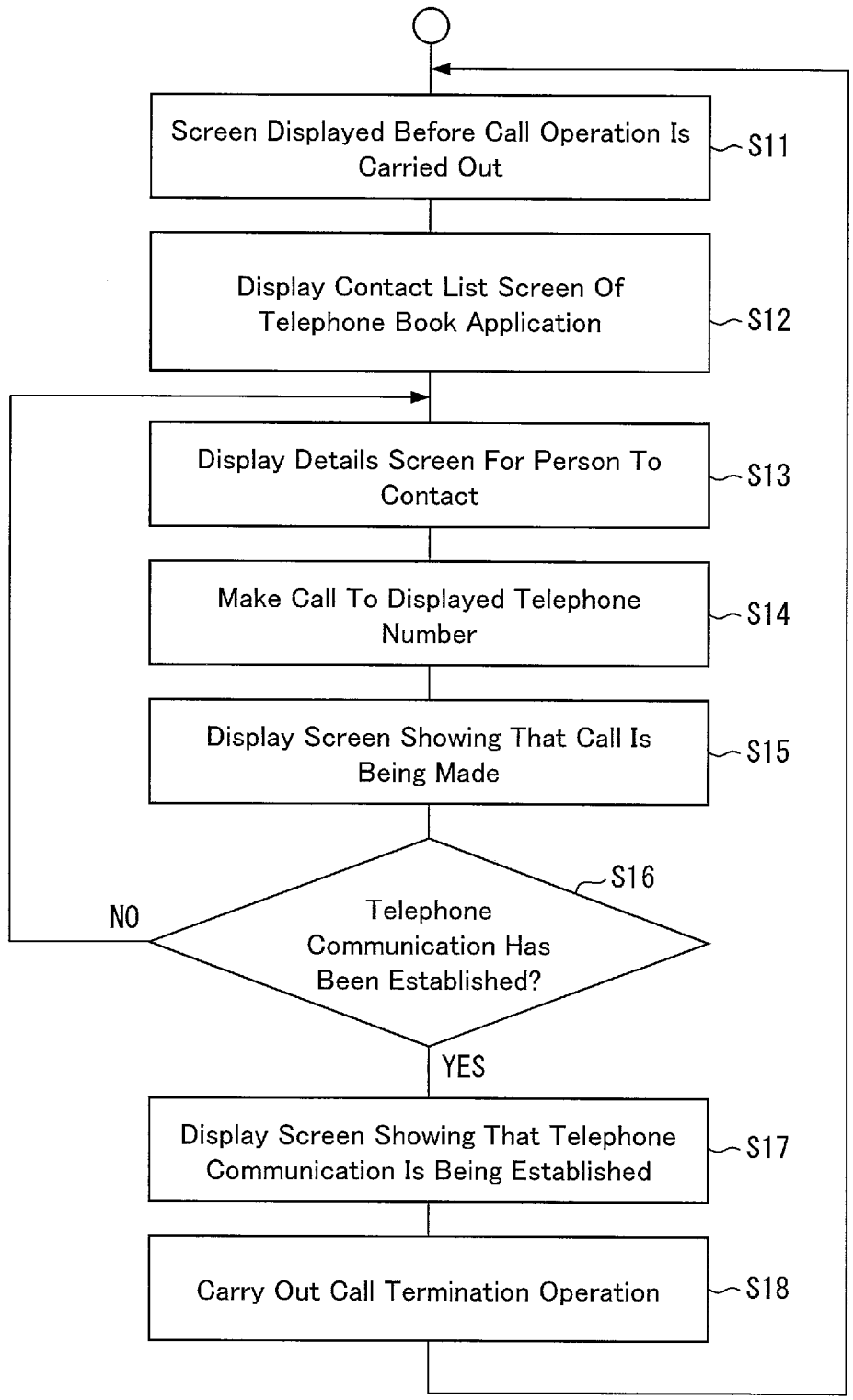
FIG. 8 is a flowchart showing how the mobile terminal of the present invention carries out a process in a case where a call is made to a person to contact by use of a details screen for a person to contact of a telephone book application.

FIG. 8 is a flowchart showing how the mobile terminal 1 carries out the process in a case where a call is made to a person to contact by use of the details screen for a person to contact of the telephone book application.

The standby screen control section 21 executes the standby screen display program 31 with reference to the memory section 30, and supplies, to the display section 13, a signal for displaying the standby screen.

When receiving, from the standby screen control section 21, the signal for displaying the standby screen, the display section 13 displays the standby screen 310 as a screen which is displayed before a call operation is carried out (step S11).

Next, in a case where the telephone book application activation icon 320 is selected by the user, the control section 20 obtains, from the operation section 14, a signal that the telephone book application activation icon 320 has been selected. Then, with reference to the memory section 30, the telephone book control section 22 executes the telephone book application 32 by loading the telephone book application 32. Meanwhile, with reference to the telephone book DB 37, the telephone book control section 22 supplies, to the display section 13, a signal for displaying the contact list screen 320a for displaying the names of the plurality of persons to contact which names are registered in the telephone book DB 37.

When receiving, from the telephone book control section 22, the signal for displaying the contact list screen 320a, the display section 13 displays the contact list screen 320a (step S12). The telephone book control section 22 thus causes the display section 13 to display the contact list screen 320a.

Next, in a case where any one of the names, i.e., any one of the plurality of contact lists 321a is selected by the user from the plurality of contact lists 321a which display the respective names of the persons to contact which names are displayed in the contact list screen 320a, the control section 20 obtains, from the operation section 14, a signal that the any one of the plurality of contact lists 321a has been selected. Then, the telephone book control section 22 obtains, with reference to the memory section 30, information on various contacts which are associated with a name displayed in the selected contact list 321a, and supplies, to the display section 13, a signal for displaying the details screen 320b for a person to contact which details screen 320b corresponds to the selected contact list 321a.

When receiving, from the telephone book control section 22, the signal for displaying the details screen 320b for a person to contact, the display section 13 displays the details screen 320b for a person to contact (step S13). The telephone book control section 22 thus causes the display section 13 to display the details screen 320b for a person to contact.

Next, in a case where the call icon 321b provided in the details screen 320b for a person to contact is selected by the user, the control section 20 obtains, from the operation section 14, a signal that the call icon 321b has been selected. Then, the telephone communication control section 23 activates the telephone application 33 with reference to the memory section 30, supplies, to the communication section 10, a signal that a call is to be made to a telephone number displayed in the details screen 320b for a person to contact, and supplies, to the display section 13, a signal for displaying the screen 330c showing that a call is being made.

When receiving, from the telephone communication control section 23, the signal that a call is to be made, the communication section 10 supplies a telephone communication wireless signal to a predetermined base station. That is, the communication section 10 makes a call to a telephone number displayed in the display section 13 (step S14).

The telephone communication control section 23 thus carries out a call process with respect to a telephone number that is registered in the telephone book DB 37 so as to be associated with a name of a person to contact which name is displayed in the details screen 320b for a person to contact.

When receiving, from the telephone communication control section 23, the signal for displaying the screen 330c showing that a call is being made, the display section 13 displays the screen 330c showing that a call is being made (step S15). As described earlier, the telephone communication control section 23 carries out a call process with respect to a telephone number that is registered in the telephone book DB 37 so as to be associated with a name of a person to contact which name is displayed in the details screen 320b for a person to contact, and causes the display section 13 to display the screen 330c showing that a call is being made. In this case, the telephone book control section 22 causes the signal for displaying the details screen 320b for a person to contact which details screen 320b is displayed by the display section 13 to be temporarily stored in a memory or the like.

When the telephone communication control section 23 carries out the call process, the telephone communication establishment determining section 23a determines whether or not a telephone communication has been established (step S16).

In a case where the telephone communication establishment determining section 23a determines that a telephone communication has been established (YES at step S16), the telephone communication control section 23 supplies, to the display section 13, a signal for displaying the screen 330d showing that a telephone communication is being established. When obtaining, from the telephone communication control section 23, the signal for displaying the screen 330d showing that a telephone communication is being established, the display section 13 displays the screen 330d showing that a telephone communication is being established (step S17).

Next, when the user carries out a call termination operation of, for example, selecting the call termination icon 331d of the screen 330d showing that a telephone communication is being established (step S18), the operation section 14 supplies, to the control section 20, a signal that the user has carried out the call termination operation, and the telephone communication control section 23 supplies, to the standby screen control section 21, a signal that a telephone communication is to be terminated, and deactivates the telephone application 33 by terminating the execution of the telephone application 33. Further, the telephone book control section 22 deactivates the telephone book application 32 by terminating the execution of the telephone book application 32.

When receiving, from the telephone communication control section 23, the signal that a telephone communication is to be terminated, the standby screen control section 21 executes the standby screen display program 31 with reference to the memory section 30, and supplies, to the display section 13, information for displaying the standby screen.

When receiving, from the standby screen control section 21, the signal for displaying the standby screen 310, the display section 13 displays the standby screen 310. That is, the process returns to step S11.

As described earlier, in a case where the telephone communication establishment determining section 23a determines that a telephone communication has been established, the standby screen control section 21 executes the standby screen display program 31, and the display section 13 displays the standby screen 310.

Meanwhile, in a case where the telephone communication establishment determining section 23a determines at step S16 that no telephone communication has been established (NO at step S16), the telephone communication control section 23 supplies, to the telephone book control section 22, the signal that a telephone communication is to be terminated, and terminates, by deactivating the telephone application 33, the display of the screen 330c showing that a call is being made.

When obtaining, from the telephone communication control section 23, the signal that a telephone communication is to be terminated, the telephone book control section 22 loads information for displaying the details screen 320b for a person to contact, the information having been temporarily stored in the memory, and supplies, to the display section 13, the information for displaying the details screen 320b for a person to contact.

When obtaining, from the telephone book control section 22, the information for displaying the details screen 320b for a person to contact, the display section 13 redisplays the details screen 320*b* for a person to contact. That is, the process returns to step S13.

As described earlier, in a case where the telephone communication establishment determining section 23*a* determines that no telephone communication has been established, after the telephone communication control section 23 terminates the display of the screen 330*c* showing that a call is being made, the telephone book control section 22 causes the display section 13 to redisplay the details screen 320*b* for a person to contact which details screen 320*b* has been displayed earlier by one screen than the screen 330*c* showing that a call is being made.

As described earlier, according to the mobile terminal 1, when the telephone communication control section 23 carries out the call process, the telephone communication establishment determining section 23*a* determines whether or not a telephone communication has been established. Therefore, unlike the communication terminal disclosed in Patent Literature 1, it is unnecessary for the mobile terminal 1 to pre-register, in the telephone book DB 37, a time period in which a person to contact can establish a telephone communication. Further, it is possible for the mobile terminal 1 to prevent an increase in load on the user of registering, in the telephone book DB 37, information on a person to contact. This makes it possible to prevent a decrease in user convenience.

Further, according to the mobile terminal 1, in a case where the telephone communication control section 23 carries out, by use of the details screen 320*b* for a person to contact which details screen 320*b* is displayed in the display section 13, the call process with respect to a telephone number that is registered in the telephone book DB 37 so as to be associated with a name of a person to contact which name is displayed in the details screen 320*b* for a person to contact, and the telephone communication establishment determining section 23*a* determines that a telephone communication has been established, the telephone book control section 22 deactivates the telephone book application by terminating the execution of the telephone book application 32.

As described earlier, in a case where a telephone communication has been established, the telephone book control section 22 terminates the execution of the telephone book application 32 which has been displaying the details screen 320*b* for a person to contact an object of which details screen 320*b* of being displayed in the display section 13 has been achieved. Therefore, a screen that is displayed in the display section 13 in a case where the telephone book application 32 is executed and that is exemplified by the details screen 320*b* for a person to contact which details screen 320*b* includes many pieces of personal information is redisplayed only by user operation.

Therefore, according to the mobile terminal 1, in order to close the details screen 320*b* for a person to contact, it is unnecessary for the user to carry out any operation.

As a result, unlike the case of the mobile terminal of Comparative Example 1 (described earlier) in which case a call is made by use of the details screen 820*b* for a person to contact, and the details screen 820*b* for a person to contact is redisplayed though a telephone communication with the person to contact has been established, the mobile terminal 1 makes it possible to prevent a continued display of personal information registered in the telephone book DB 37 while increasing user convenience.

Further, in a case where the telephone communication control section 23 carries out, by use of the details screen 820*b* for a person to contact which details screen 820*b* is displayed in the display section 13 by executing the telephone book application 32, the call process with respect to a telephone number that is registered in the telephone book DB 37 so as to be associated with a name of a person to contact which name is displayed in the details screen 820*b* for a person to contact, and the telephone communication establishment determining section 23*a* determines that no telephone communication has been established, the telephone book control section 22 loads a signal for displaying the details screen 820*b* for a person to contact, the signal having been temporarily stored in the memory, and causes the display section 13 to redisplay the details screen 820*b* for a person to contact.

According to this, unlike the mobile terminal of Comparative Example 2, the mobile terminal 1 makes it possible to redial, by use of the redisplayed details screen 820*b* for a person to contact, the telephone number of the person to contact with which person no telephone communication has been established, or to transmit, by use of another contact means such as a mail or an SNS, information to the person to contact with which person no telephone communication has been established.

Therefore, the mobile terminal 1 allows a further increase in user convenience as compared with a case where the details screen 820*b* for a person to contact is closed though an object of displaying, in the display section 13, the details screen 820*b* for a person to contact has not been achieved.

As described earlier, according to the mobile terminal 1, it is possible to prevent (i) a continued display of personal information registered in the telephone book DB 37 and (ii) a decrease in user convenience even in a case where a call process for establishing a telephone communication is carried out by use of a screen which is displayed by executing the telephone book application 32 that differs from the telephone application 33 and which is exemplified by the details screen 820*b* for a person to contact.

As described earlier, according to the mobile terminal 1, even in a case where the call process has been made by use of the details screen 820*b* for a person to contact of the telephone book application 32 that differs from the telephone application 33 which is an application executed by the telephone communication control section 23 including the telephone communication establishment determining section 23*a*, a subsequent display screen to be displayed in the display section 13 varies in accordance with the determination by the telephone communication establishment determining section 23*a* whether or not a telephone communication has been established.

Therefore, it is possible to prevent (i) a continued display of personal information registered in the telephone book DB 37 and (ii) a decrease in user convenience, though it takes trouble to develop a program for causing the telephone application 33 and the telephone book application 32 to operate in cooperation with each other.

The details screen 320*b* for a person to contact is provided with the call icon 321*b* and the mail application activation icons 322 and 323*b*. Further, the details screen 320*b* for a person to contact is also provided with the SNS activation icons for using SNSs such as Mixi (Registered Trademark) and Twitter (Registered Trademark).

That is, in a case where the telephone communication establishment determining section 23*a* determines that no telephone communication has been established, by causing the display section 13 to display the details screen 820*b* for a person to contact, the telephone book control section 22 causes the display section 13 to display (i) the mail application activation icons 322*b* and 323*b* for contacting a mail address that is registered in the telephone book DB 37 so as to be associated with a name of a person to contact with which person no telephone communication has been established, and (ii) the SNS activation icons for using SNSs such as Mixi (Registered Trademark) and Twitter (Registered Trademark).

Unlike the mobile terminal of Comparative Example 1, according to the mobile terminal 1, the details screen 820*b* for a person to contact is redisplayed in the display section 13 in a case where no telephone communication has been established. Therefore, not only by a telephone communication but also by various methods, e.g., by using a mail, Mixi (Registered Trademark), Twitter (Registered Trademark), and the like, the user can contact a person to contact with which person no telephone communication has been established. This makes it possible to efficiently make contact, so that user convenience is great.

As described earlier, the telephone book application 32 is provided with a plurality of lead wires of communication means such as voice call or mail transmission for contacting a person to contact. Therefore, particularly in a case where no telephone communication has been established, it is possible to immediately execute alternative contact means by returning to a display screen of the telephone book application 32. This yields a greater effect of increasing user convenience.

Figure 9:
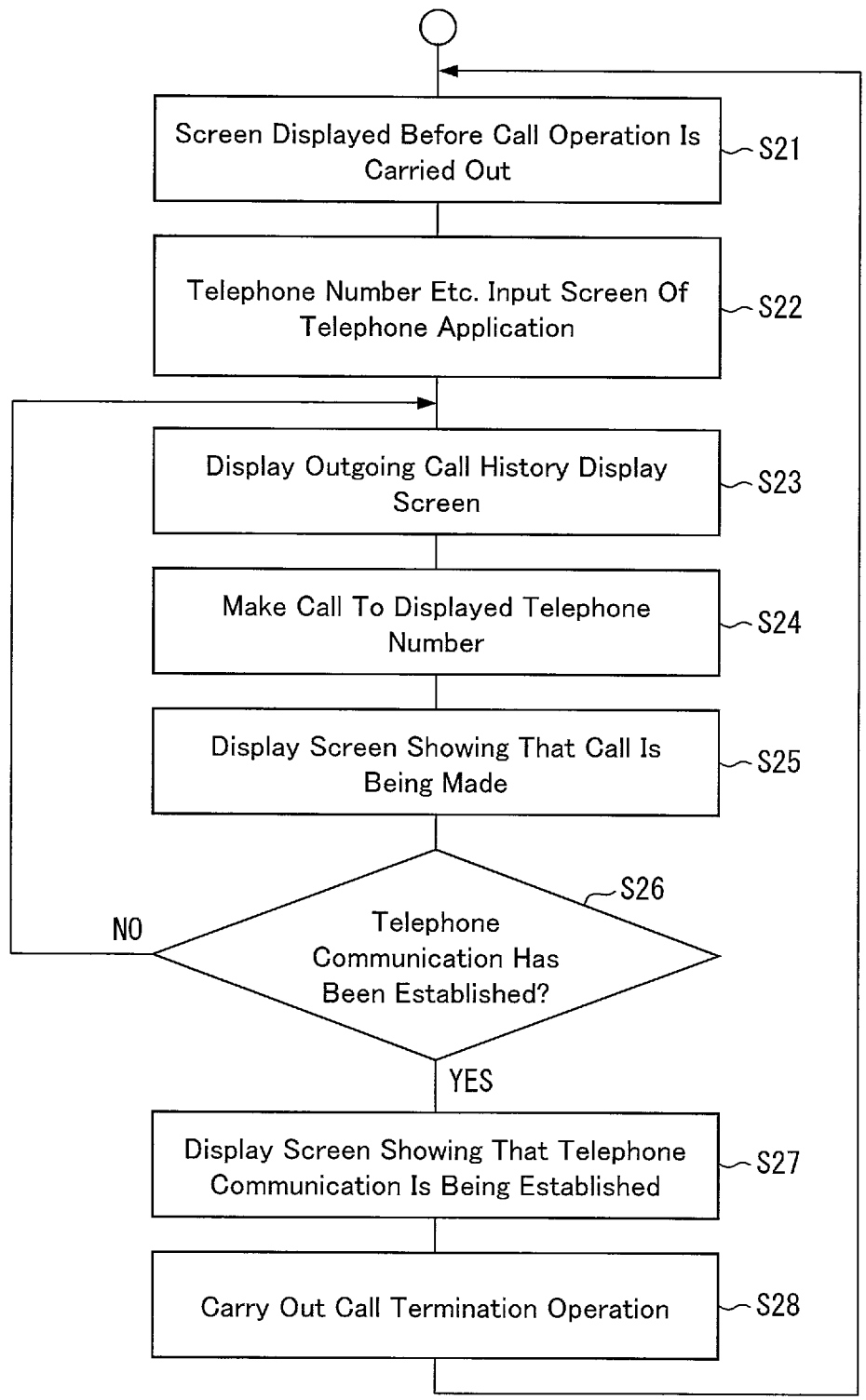
FIG. 9 is a flowchart showing how the mobile terminal of the present invention carries out a process in a case where a call is made to a person to contact by use of an outgoing call history display screen or an incoming call history display screen of a telephone application.

Next, the following description discusses, with reference to FIG. 9, how the mobile terminal 1 carries out the process in a case where the user makes a call to a person to contact by use of an outgoing call history display screen or an incoming call history screen of a telephone application.

Note that a process carried out in a case where a call is made to a person to contact by use of the incoming call history screen of a telephone application and a process carried out in a case where a call is made to a person to contact by use of the outgoing call history display screen are identical. Therefore, the case where a call is made to a person to contact by use of the outgoing call history display screen is mainly described here.

FIG. 9 is a flowchart showing how the mobile terminal 1 carries out the process in the case where a call is made to a person to contact by use of the outgoing call history display screen of the telephone application.

The standby screen control section 21 executes the standby screen display program 31 with reference to the memory section 30, and supplies, to the display section 13, information for displaying the standby screen 310.

When receiving, from the standby screen control section 21, the information for displaying the standby screen, the display section 13 displays the standby screen 310 as a screen which is displayed before a call operation is carried out (step S21).

Next, in a case where the telephone application activation icon 330 is selected by the user, the control section 20 obtains, from the operation section 14, a signal that the telephone application activation icon 330 has been selected. Then, the telephone communication control section 23 activates the telephone application activation icon 330 with reference to the memory section 30, and supplies, to the display section 13, a signal for displaying the telephone number etc. input screen 330*a*.

When receiving, from the telephone communication control section 23, the signal for displaying the telephone number etc. input screen 330*a*, the display section 13 displays the telephone number etc. input screen 330*a* (step S22).

Subsequently, in a case where the outgoing call history icon 334*a* (or the incoming call history icon 333*a*) displayed in the telephone number etc. input screen 330*a* is selected by the user, the control section 20 obtains, from the operation section 14, a signal that the outgoing call history icon 334*a* (or the incoming call history icon 333*a*) has been selected. Then, the telephone communication control section 23 supplies, to the display section 13, a signal for displaying the outgoing call history display screen 330*b* (or the incoming call history display screen 330*e*).

When receiving, from the telephone communication control section 23, the signal for displaying the outgoing call history display screen 330*b* (or the incoming call history display screen 330*e*), the display section 13 displays the outgoing call history display screen 330*b* (or the incoming call history display screen 330*e*) (step S23).

Thereafter, in a case where the call icon 332*b* (or the call icon 332*e*) provided in any one of the contact fields 331*b* (or the contact fields 330*e*) provided in the outgoing call history display screen 330*b* (or the incoming call history display screen 330*e*) is selected by the user, the control section 20 obtains, from the operation section 14, a signal that the call icon 332*b* (or the call icon 332*e*) has been selected. Then, the telephone communication control section 23 supplies, to the communication section 10, a signal that a call is to be made to a telephone number displayed in the selected contact field 331*b* (or the contact field 330*e*), and supplies, to the display section 13, a signal for displaying the screen 330*c* showing that a call is being made.

When receiving, from the telephone communication control section 23, the signal that a call is to be made, the communication section 10 supplies a telephone communication wireless signal to a predetermined base station. That is, the communication section 10 makes a call to a telephone number displayed in the display section 13 (step S24).

When receiving, from the telephone communication control section 23, the signal for displaying the screen 330*c* showing that a call is being made, the display section 13 displays the screen 330*c* showing that a call is being made (step S25).

The telephone communication establishment determining section 23*a* determines whether or not a telephone communication has been established (step S26).

In a case where the telephone communication establishment determining section 23*a* determines that a telephone communication has been established (YES at step S25), the telephone communication control section 23 supplies, to the display section 13, a signal for displaying the screen 330*d* showing that a telephone communication is being established. When obtaining, from the telephone communication control section 23, the signal for displaying the screen 330*d* showing that a telephone communication is being established, the display section 13 displays the screen 330*d* showing that a telephone communication is being established (step S27).

Next, when the user carries out a call termination operation of, for example, selecting the call termination icon 331*d* of the screen 330*d* showing that a telephone communication is being established (step S28), the operation section 14 supplies, to the control section 20, a signal that the user has carried out the call termination operation, and the telephone communication control section 23 supplies, to the standby screen control section 21, a signal that a telephone communication is to be terminated, and deactivates the telephone application 33. When receiving, from the telephone communication control section 23, the signal that a telephone communication is to be terminated, the standby screen control section 21 executes the standby screen display program 31 with reference to the memory section 30, and supplies, to the display section 13, a signal for displaying the standby screen.

When receiving, from the standby screen control section 21, the signal for displaying the standby screen, the display section 13 displays the standby screen 310. That is, the process returns to step S21.

Meanwhile, in a case where the telephone communication establishment determining section 23a determines at step S26 that no telephone communication has been established (NO at step S25), in order to display the outgoing call history display screen 330b (or the incoming call history display screen 330e) which has been displayed earlier by one screen than the screen 330c showing that a call is being made, the telephone communication control section 23 supplies, to the display section 13, a signal for displaying the outgoing call history display screen 330b (or the incoming call history display screen 330e).

When receiving, from the telephone communication control section 23, the signal for displaying the outgoing call history display screen 330b (or the incoming call history display screen 330e), the display section 13 displays the outgoing call history display screen 330b (or the incoming call history display screen 330e). That is, the process returns to step S23.

As described earlier, in a case where the telephone communication control section 23 carries out the call process by use of the outgoing call history display screen 330b (or the incoming call history display screen 330e) and the telephone communication establishment determining section 23a determines that no telephone communication has been established, the telephone communication control section 23 terminates the display of the screen 330c showing that a call is being made, and causes the display section 13 to redisplay the outgoing call history display screen 330b (or the incoming call history display screen 330e). This allows the user to carry out a redial operation by use of the redisplayed outgoing call history display screen 330b (or incoming call history display screen 330e), so that user convenience is great.

Meanwhile, in a case where the telephone communication control section 23 carries out the call process by use of the outgoing call history display screen 330b (or the incoming call history display screen 330e) and the telephone communication establishment determining section 23a determines that a telephone communication has been established, after the display of the screen 330d showing that a telephone communication is being established, the standby screen control section 21 causes the display section 13 to display the standby screen 310. This allows the user to carry out another operation by selecting, from the standby screen 310, various icons displayed in the standby screen 310, so that user convenience is great.

<Program and Storage Medium>

The control sections of the control section 20 of the present invention may be realized by way of hardware or software as executed by a CPU (Central Processing Unit).

The control sections (the standby screen control section 21, the telephone book control section 22, the telephone communication control section 23, the mail transmission and reception control section 24, the SNS transmission and reception control section 25, and the state management control section 26) of the control section 20 each include a CPU that executes instructions of a program realizing the foregoing functions; and memory devices including a ROM (Read Only Memory) storing the program, a RAM (Random Access Memory) that develops the program in executable form, and a memory storing the program and various kinds of data.

The object of the present invention can be achieved by causing a control program for realizing the control sections of the control section 20 to make a storage medium storing program codes (an executable program, an intermediate code program, and a source program) of the control program available to the control sections of the control section 20, and by causing the control section 20 to retrieve and execute the program codes stored in the storage medium, whether or not the control program is held by a program memory in a fixed manner.

The storage medium is not limited to a storage medium of a specific structure or type. The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The object of the present invention can also be achieved by arranging the control sections of the control section 20 to be connectable to a communications network. In this case the program codes are made available over the communications network. Such a communications network is not limited to a communications network of a specific structure or type provided that the communications network can make the program codes available to the control sections of the control section 20. The communications network may be, for example, the Internet, an intranet, extranet, LAN, ISDN, VAN, CATV communications network, virtual dedicated network (Virtual Private Network), telephone line network, mobile communications network, or satellite communications network.

A transfer medium which makes up the communications network is not limited to a transfer medium of a specific structure or type provided that the transfer medium can transfer the program codes. The transfer medium may be, for example, wired line, such as IEEE 1394, USB, electric power line, cable TV line, telephone line, or ADSL (Asymmetric Digital Subscriber Line) line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal in which the program codes are embodied electronically and which is embedded in a carrier wave.

CONCLUSION

As described earlier, a mobile terminal according to an embodiment of the present invention, the mobile terminal having a telephone function, includes: a display section; a telephone book database in which a name of a person to contact and a telephone number are registered so as to be associated with each other; a telephone book application for obtaining information which is registered in the telephone book database; a telephone application for making a call, the telephone application differing from the telephone book application; a memory section in which the telephone book application and the telephone application are stored; a telephone book control section which executes the telephone book application and causes the display section to display a details screen for a person to contact which details screen displays the name of the person to contact which name is registered in the telephone book database and the telephone number that is registered in the telephone book database so as to be associated with the name; a telephone communication control section which carries out a call process with respect to the telephone number that is registered in the telephone book database so as to be associated with the name of the person to contact which name is displayed in the details screen for a person to contact, and which causes the display section to display a screen showing that a call is being made; and a telephone communication establishment determining section which, when the telephone communication control section carries out the call process, determines whether or not a telephone communication has been established, in a case where the telephone communication establishment determining section determines that a telephone communication has been established, the telephone book control section terminating the execution of the telephone book application, and in a case where the telephone communication establishment determining section determines that no telephone communication has been established, after the telephone communication control section terminates the display of the screen showing that a call is being made, the telephone book control section causing the display section to redisplay the details screen for a person to contact.

As described earlier, a method according to an embodiment of the present invention for controlling a mobile terminal having a telephone function, the mobile terminal including: a display section; a telephone book database in which a name of a person to contact and a telephone number are registered so as to be associated with each other; a telephone book application for obtaining information which is registered in the telephone book database; a telephone application for making a call, the telephone application differing from the telephone book application; and a memory section in which the telephone book application and the telephone application are stored; the method includes the steps of: executing the telephone book application and causing the display section to display a details screen for a person to contact which details screen displays the name of the person to contact which name is registered in the telephone book database and the telephone number that is registered in the telephone book database so as to be associated with the name; carrying out a call process with respect to the telephone number that is registered in the telephone book database so as to be associated with the name of the person to contact which name is displayed in the details screen for a person to contact, and causing the display section to display a screen showing that a call is being made; when the call process is carried out, determining whether or not a telephone communication has been established; in a case where it is determined that a telephone communication has been established, terminating the execution of the telephone book application; and in a case where it is determined that no telephone communication has been established, after the display of the screen showing that a call is being made is terminated, causing the display section to redisplay the details screen for a person to contact.

According to the configuration, when the telephone communication control section carries out the call process, the telephone communication establishment determining section determines whether or not a telephone communication has been established. Therefore, it is unnecessary to preregister, in the telephone book database, a time period in which a person to contact can establish a telephone communication. Further, it is possible to prevent an increase in load on a user of registering, in the telephone book database, information on a person to contact. This makes it possible to prevent a decrease in user convenience.

Further, according to the configuration, in a case where the telephone communication control section carries out, by use of the details screen for a person to contact which details screen is displayed in the display section by executing the telephone book application, the call process with respect to the telephone number of the person to contact which telephone number is displayed in the details screen for a person to contact, and the telephone communication establishment determining section determines that a telephone communication has been established, the telephone book control section terminates the execution of the telephone book application.

As described earlier, in a case where a telephone communication has been established, the telephone book control section terminates the execution of the telephone book application which has been displaying the details screen for a person to contact an object of which details screen of being displayed in the display section has been achieved. Therefore, the details screen for a person to contact which details screen includes many pieces of personal information is redisplayed only by user operation.

Therefore, in order to close the details screen for a person to contact, it is unnecessary for the user to carry out any operation. As a result, as compared with a case where the details screen for a person to contact continues to be displayed though an object of displaying, in the display section, the details screen for a person to contact has been achieved, the configuration makes it possible to prevent a continued display of personal information registered in the telephone book database while increasing user convenience.

Further, according to the configuration, in the case where the telephone communication control section carries out, by use of the details screen for a person to contact which details screen is displayed in the display section by executing the telephone book application, the call process with respect to the telephone number of the person to contact which telephone number is displayed in the details screen for a person to contact, and the telephone communication establishment determining section determines that no telephone communication has been established, after the telephone communication control section terminates the display of the screen showing that a call is being made, the telephone book control section causes the display section to redisplay the details screen for a person to contact.

According to this, it is possible to redial, by use of the redisplayed details screen for a person to contact, the telephone number of the person to contact with which person no telephone communication has been established, or to contact the person to contact by use of another contact means. Therefore, the configuration allows a further increase in user convenience as compared with a case where the details screen for a person to contact is closed though the object of displaying, in the display section, the details screen for a person to contact has not been achieved.

As described earlier, according to the configuration, it is possible to prevent (i) a continued display of personal information registered in the telephone book database and (ii) a decrease in user convenience even in a case where the carried out by use of a screen which is displayed by executing the telephone book application.

The mobile terminal is preferably arranged such that: contact information which differs from the telephone number is registered in the telephone book database so as to be associated with the name of the person to contact; a contact information application for contacting the contact information is stored in the memory section; and the details screen for a person to contact is provided with a contact information icon for executing the contact information application for contacting the contact information that is registered in the telephone book database so as to be associated with the name of the person to contact which name is displayed in the details screen for a person to contact.

According to the configuration, in the case where the telephone communication establishment determining section determines that no telephone communication has been established, after the telephone communication control section terminates the display of the screen showing that a call is being made, the telephone book control section causes the display section to redisplay the details screen for a person to contact. Therefore, by selecting the contact information icon, the user can contact information on an identical person to contact, the contact information differing from the telephone number.

This makes it possible for the user to efficiently carry out information exchange.

The mobile terminal is preferably arranged such that the contact information is a mail address. According to this, in a case where no telephone communication has been established, the user can transmit a mail to an identical person to contact. This makes it possible for the user to efficiently carry out information exchange.

The mobile terminal is preferably arranged such that: an icon screen display program for displaying, in the display section, an icon screen which is provided with the contact information icon is stored in the memory section, the mobile terminal further including: an icon screen control section for executing the icon screen display program.

The configuration allows the user to execute the contact information application by use of the icon screen.

The mobile terminal is preferably arranged such that: in the case where the telephone communication establishment determining section determines that a telephone communication has been established, the icon screen control section executes the icon screen display program, and the display section displays the icon screen.

According to the configuration, in the case where the telephone communication establishment determining section determines that a telephone communication has been established, the display section displays the icon screen. Therefore, the user can execute the contact information application by use of the icon screen. According to this, it is possible to increase user convenience.

The mobile terminal is preferably arranged such that: the icon screen is provided with a telephone icon for executing the telephone book application and a telephone communication icon for executing the telephone application; the telephone book control section executes the telephone book application in a case where the telephone book icon is selected; and the telephone communication control section executes the telephone application in a case where the telephone communication icon is selected.

According to the configuration, in the case where the telephone communication establishment determining section determines that a telephone communication has been established, the display section displays the icon screen. Therefore, by use of the icon screen, the user can execute the telephone book application, and execute the telephone application. This allows a reduction in number of times of user operation for executing the telephone book application and for executing the telephone application, so that user convenience can be increased.

The mobile terminal is preferably arranged such that: by executing the telephone application, the telephone communication control section causes the display section to display an outgoing call history screen which chronologically displays a plurality of telephone numbers with respect to each of which the call process was carried out before and an incoming call history screen which chronologically displays a plurality of telephone numbers from each of which a call was received before; the telephone communication control section carries out the call process with respect to a telephone number selected among the plurality of telephone numbers displayed in the outgoing call history screen or among the plurality of telephone numbers displayed in the incoming call history screen, and causes the display section to display the screen showing that a call is being made; when the telephone communication control section carries out the call process, the telephone communication establishment determining section determines whether or not a telephone communication has been established; in the case where the telephone communication establishment determining section determines that no telephone communication has been established, the telephone communication control section terminates the display of the screen showing that a call is being made, and causes the display section to redisplay the outgoing call history screen or the incoming call history screen; and in the case where the telephone communication establishment determining section determines that a telephone communication has been established, after the display of the screen showing that a call is being made, the icon screen control section causes the display section to display the icon screen.

According to the configuration, in a case where the telephone communication control section carries out the call process by use of the outgoing call history display screen or the incoming call history display screen and the telephone communication establishment determining section determines that no telephone communication has been established, the telephone communication control section terminates the display of the screen showing that a call is being made, and causes the display section to redisplay the outgoing call history display screen or the incoming call history display screen. This allows the user to carry out a redial operation by use of the redisplayed outgoing call history display screen or incoming call history display screen, so that user convenience is great.

Meanwhile, in a case where the telephone communication control section carries out the call process by use of the outgoing call history display screen or the incoming call history display screen and the telephone communication establishment determining section determines that a telephone communication has been established, after the display of the screen showing that a call is being made, the icon screen control section causes the display section to display the icon screen. This allows the user to carry out another operation by use of the icon screen, so that user convenience is great.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is usable for various mobile terminals each having a telephone function.

REFERENCE SIGNS LIST

1 Mobile terminal
13 Display section
20 Control section
21 Standby screen control section (Icon screen control section)
22 Telephone book control section
23 Telephone communication control section
23a Telephone communication establishment determining section
24 Mail transmission and reception control section 25 SNS transmission and reception control section
26 State management control section
30 Memory section
31 Standby screen display program (Icon screen display program)
32 Telephone book application
33 Telephone application
34 Mail application (Contact information application)
35 SNS application (Contact information application)
310 Standby screen (Icon screen)
320 Telephone book application activation icon (Telephone book icon)
320a Contact list screen
320b Details screen
321a Contact field
321b Call icon
322b, 323b Mail application activation icon
330 Telephone application activation icon (Telephone communication icon)
330a Telephone number etc. input screen
330b Outgoing call history display screen (Outgoing call history screen)
330c Screen showing that a call is being made
330d Screen showing that a telephone communication is being established
330e Incoming call history display screen (Incoming call history screen)
331b Contact field
331c, 331d Call termination icon
331e Contact field
332a, 332b, 332e Call icon
333a, 333b, 333e Incoming call history icon
334a, 334b, 334e Outgoing call history icon
340 Mail application activation icon
350, 351 SNS activation icon
37 Telephone book DB

The invention claimed is:

1. A mobile wireless terminal having a telephone function, comprising: a telephone book control section which executes a telephone book application so as to obtain, from a telephone book database in which a name of a person to contact, a telephone number, and an email address are registered so as to be associated with each other, the name of the person to contact, the telephone number, and the email address which is associated with the name, and causes a display section of the mobile wireless terminal to display the name, the telephone number, the email address, and a call icon as a details screen for a person to contact; a telephone communication control section which executes a telephone application so as to carry out a call process with respect to the telephone number that is displayed as the details screen for a person to contact, the telephone application differing from the telephone book application, and which causes the display section to display a screen showing that a call is being made; and a telephone communication establishment determining section which, when the telephone communication control section carries out the call process, determines whether or not a telephone communication has been established, in a case where the telephone communication establishment determining section determines that a telephone communication has been established, the telephone book control section terminating the execution of the telephone book application so as to cause, after the telephone communication is ended, the display section to display a standby screen which is none of the display screens of the telephone book application, and not to display the details screen for a person to contact, and in a case where the telephone communication establishment determining section determines that no telephone communication has been established, after the telephone communication control section terminates the display of the screen showing that a call is being made, the telephone book control section causing the display section to redisplay the details screen for a person to contact.

2. The mobile terminal as set forth in claim 1, wherein:
contact information which differs from the telephone number is registered in the telephone book database so as to be associated with the name of the person to contact;
the telephone book application, the telephone application, and a contact information application for contacting the contact information are stored in a memory section; and
the details screen for a person to contact is provided with a contact information icon for executing the contact information application for contacting the contact information that is registered in the telephone book database so as to be associated with the name of the person to contact which name is displayed in the details screen for a person to contact.

3. The mobile terminal as set forth in claim 2, wherein the contact information is a mail address.

4. The mobile terminal as set forth in claim 2, wherein:
an icon screen display program for displaying, in the display section, an icon screen which is provided with the contact information icon is stored in the memory section,
the mobile terminal further comprising:
an icon screen control section for executing the icon screen display program.

5. The mobile terminal as set forth in claim 4, wherein:
in the case where the telephone communication establishment determining section determines that a telephone communication has been established, the icon screen control section executes the icon screen display program, and the display section displays the icon screen.

6. The mobile terminal as set forth in claim 4, wherein:
the icon screen is provided with a telephone icon for executing the telephone book application and a telephone communication icon for executing the telephone application;
the telephone book control section executes the telephone book application in a case where the telephone book icon is selected; and
the telephone communication control section executes the telephone application in a case where the telephone communication icon is selected.

7. The mobile terminal as set forth in claim 5, wherein:
by executing the telephone application, the telephone communication control section causes the display section to display an outgoing call history screen which chronologically displays a plurality of telephone numbers with respect to each of which the call process was carried out before and an incoming call history screen which chronologically displays a plurality of telephone numbers from each of which a call was received before;
the telephone communication control section carries out the call process with respect to a telephone number selected among the plurality of telephone numbers displayed in the outgoing call history screen or among the plurality of telephone numbers displayed in the incoming call history screen, and causes the display section to display the screen showing that a call is being made;
when the telephone communication control section carries out the call process, the telephone communication establishment determining section determines whether or not a telephone communication has been established;

in the case where the telephone communication establishment determining section determines that no telephone communication has been established, the telephone communication control section terminates the display of the screen showing that a call is being made, and causes the display section to redisplay the outgoing call history screen or the incoming call history screen; and in the case where the telephone communication establishment determining section determines that a telephone communication has been established, after the display of the screen showing that a call is being made, the icon screen control section causes the display section to display the icon screen.

8. A method for controlling a mobile wireless terminal having a telephone function, the method comprising the steps of: (a) executing a telephone book application so as to obtain, from a telephone book database in which a name of a person to contact, a telephone number, and an email address are registered so as to be associated with each other, the name of the person to contact, the telephone number, and an email address which is associated with the name, and causing a display section of the mobile wireless terminal to display the name, the telephone number, the email address, and a call icon as a details screen for a person to contact; (b) executing a telephone application so as to carry out a call process with respect to the telephone number that is displayed as the details screen for a person to contact, the telephone application differing from the telephone book application, and causing the display section to display a screen showing that a call is being made; (c) when the call process is carried out, determining whether or not a telephone communication has been established; (d) in a case where it is determined in the step (c) that a telephone communication has been established, terminating the execution of the telephone book application so as to cause, after the telephone communication is ended, the display section to display a standby screen which is none of the display screens of the telephone book application, and not to display the details screen for a person to contact; and (e) in a case where it is determined in the step (c) that no telephone communication has been established, after the display of the screen showing that a call is being made is terminated, causing the display section to redisplay the details screen for a person to contact.

9. A non-transitory computer-readable storage medium storing a control program causing a computer to carry out the steps recited in claim 8.

* * * * *